United States Patent
Chokhani et al.

(10) Patent No.: US 11,579,194 B1
(45) Date of Patent: Feb. 14, 2023

(54) UTILIZING SINGLE CYCLE ATPG TEST PATTERNS TO DETECT MULTICYCLE CELL-AWARE DEFECTS

(71) Applicant: Cadence Design Systems, Inc., San Jose, CA (US)

(72) Inventors: Arvind Chokhani, Murphy, TX (US); Joseph Michael Swenton, Owego, NY (US); Martin Thomas Amodeo, Santa Clara, CA (US)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 0 days.

(21) Appl. No.: 17/342,764

(22) Filed: Jun. 9, 2021

(51) Int. Cl.
- *G01R 31/28* (2006.01)
- *G06F 11/00* (2006.01)
- *G01R 31/3183* (2006.01)
- *G01R 31/3185* (2006.01)

(52) U.S. Cl.
CPC ........ *G01R 31/318342* (2013.01); *G01R 31/318547* (2013.01); *G01R 31/318563* (2013.01)

(58) Field of Classification Search
CPC .... G01R 31/318342; G01R 31/318547; G01R 31/318563
See application file for complete search history.

(56) References Cited

U.S. PATENT DOCUMENTS

| | | | |
|---|---|---|---|
| 6,707,313 B1 * | 3/2004 | Rohrbaugh | G01R 31/31813 324/762.02 |
| 7,779,381 B2 | 8/2010 | Chickermane et al. | |
| 7,925,941 B2 | 4/2011 | Bhatia | |
| 8,875,077 B1 | 10/2014 | O' et al. | |
| 10,528,692 B1 | 1/2020 | Guo et al. | |
| 2006/0053357 A1 * | 3/2006 | Rajski | G01R 31/31835 714/742 |
| 2007/0250749 A1 * | 10/2007 | Lin | G01R 31/318357 714/738 |
| 2009/0132976 A1 * | 5/2009 | Desineni | G01R 31/318342 716/106 |

OTHER PUBLICATIONS

F. Hapke et al., "Defect-oriented cell-aware ATPG and fault simulation . . . designs," 2009 International Test Conference, Austin, TX, USA, 2009, pp. 1-10, doi: 10.1109/TEST.2009.

Lin, et al,. "Timing-Aware ATPG for High Quality At-speed Testing of Small Delay Defects" Dec. 2006 Proceedings of the Asian Test Symposium 2006:139-146.

(Continued)

*Primary Examiner* — Christine T. Tu
(74) *Attorney, Agent, or Firm* — Tarolli, Sundheim, Covell & Tummino LLP

(57) ABSTRACT

An integrated circuit (IC) test engine can generate a plurality of single cycle test patterns that target a plurality of static single cycle defects of a fabricated IC chip based on an IC design. The IC test engine can also fault simulate the plurality of single cycle test patterns against a plurality of multicycle defects in the IC design, wherein a given single cycle test pattern of the plurality of single cycle test patterns is sim-shifted to enable detection of a given multicycle fault and/or defect of the plurality of multicycle faults and/or defects.

20 Claims, 9 Drawing Sheets

(56) References Cited

OTHER PUBLICATIONS

Mattiuzzo, et al. "SDD automatic test-pattern generation breaks the nanometer quality barrier", Test & Measurement World, Jun. 2009.

S. Ho et al., "Automatic test pattern generation for delay . . . functions," 2013 IEEE/ACM International Conference on Computer-Aided Design, San Jose, Ca, USA, 2013, pp. 91-98.

Sherubha, et al. "Test pattern generation for longest path . . . using ATPG", International Journal Of Engineering Research and Technology, ICSEM-2013 Conference Proceedings.

Z. Gao, et al., "Defect-Location Identification for Cell-Aware Test," 2019 IEEE Latin American Test Symposium (LATS), Santiago, Chile, 2019, pp. 1-6, doi: 10.1109/LATW.2019.87.

\* cited by examiner

FIG. 3

UTILIZING SINGLE CYCLE ATPG TEST PATTERNS TO DETECT MULTICYCLE CELL-AWARE DEFECTS

TECHNICAL FIELD

This disclosure relates to testing integrated circuit (IC) chips. More particularly, this disclosure relates to utilizing single cycle ATPG test patterns to detect multicycle cell-aware defects present in a fabricated IC chip.

BACKGROUND

As IC chip complexity increases, meeting the testing requirements for acceptable quality assurance is becoming increasingly difficult. Automated testing involves applying test signals to each manufactured circuit in various patterns designed to detect defects that cause improper circuit behavior. Although most modern integrated circuits comprise a number of interconnected cells selected from a library, early testing schemes assumed that faults occurred only between cell instances, at the cell I/O ports, or elsewhere outside cells altogether. The test patterns generated therefore did not necessarily include those needed to detect circuit faults inside a cell.

ATPG (acronym for both Automatic Test Pattern Generation and Automatic Test Pattern Generator) is an electronic design automation method/technology used to find an input (or test) sequence that, when applied to a digital circuit, enables automatic test equipment to distinguish between the correct circuit behavior and the faulty circuit behavior caused by defects. The generated patterns are used to test semiconductor devices after manufacture, or to assist with determining the cause of failure. The effectiveness of ATPG systems is measured by the number of modeled defects, or faults, detectable and by the number of generated patterns. These metrics generally indicate test quality (higher with more fault detections) and test application time (higher with more patterns). ATPG efficiency is another consideration that is influenced by the fault model under consideration, the type of circuit under test (full scan, synchronous sequential, or asynchronous sequential), the level of abstraction used to represent the circuit under test (gate, register-transfer, switch), and the required test quality.

A defect is an error caused in a device during the manufacturing process. A fault (alternatively referred to as a fault model) is a mathematical description of how a defect alters design behavior. The logic values observed at the device's primary outputs, while applying a test pattern to some device under test (DUT), are called the output of that test pattern. The output of a test pattern, when testing a fault-free device that works exactly as designed, is called the expected output of that test pattern. A fault is said to be detected by a test pattern if the output of that test pattern, when testing a device that has only that one fault, is different than the expected output. The ATPG process for a targeted fault has two phases: fault activation and fault propagation. Fault activation establishes a signal value at the fault model site that is opposite of the value produced by the fault model. Fault propagation moves the resulting signal value, or fault effect, forward by sensitizing a path from the fault site to a primary output and/or an observable scan flop.

A standard cell is a group of transistor and interconnect structures that provides a Boolean logic function (e.g., AND, OR, NOR, NAND, XOR, XNOR, inverters) or a storage function (flipflop or latch). The simplest cells are direct representations of the elemental NAND, NOR and XOR Boolean function, although cells of much greater complexity are commonly used (such as a 2-bit full-adder, or muxed D-input flipflop). The cell's Boolean logic function is called its logical view: functional behavior is captured in the form of a truth table or Boolean algebra equation (for combinational logic), or a state transition table (for sequential logic).

Scan chains are the elements in scan-based designs of IC chips that are used to shift-in and shift-out test data. A scan chain is formed by a number of observable scan flops connected back to back in a chain with the output of one observable scan flop connected to another. The input of a first observable scan flop is connected to the input pin of the chip (called scan-in) from where scan data is fed. The output of the last observable scan flop is connected to the output pin of the chip (called scan-out) which is used to observe or measure the data shifted out. Output pins of the IC chip can be directly observed with automatic test equipment (ATE).

An observable scan flop or observable scan flip-flop (SFF) in a scan chain is a muxed input master-slave based D flip-flop. In other words, an observable scan flop is a D flip-flop that allows its input to come from a data port (D) or from an alternative source, namely, as scan-input (SI) port. A scan enable signal (SE) controls each scan flop. More particularly, if the scan enable signal is asserted (e.g., logical 1), scan flop passes data received at the scan-input (SI) port to an output port (Q) of scan flop. Conversely, if the scan enable signal is de-asserted (e.g., logical 0), scan flop passes data received at the data port (D) to the output port. In this manner, scan flop is employable in a scan chain to test an IC chip, and is employable for functional operation of the IC chip.

SUMMARY

One example relates to a non-transitory machine-readable medium having machine-readable instructions. The machine-readable instructions include an IC test engine that can generate a plurality of single cycle test patterns that target a plurality of static single cycle faults and/or defects of a fabricated IC chip based on an IC design. The IC test engine can also fault simulate the plurality of single cycle test patterns against a plurality of multicycle faults and/or defects in the IC design. A given single cycle test pattern of the plurality of single cycle test patterns is sim-shifted to enable detection of a given multicycle fault and/or defect of the plurality of multicycle faults and/or defects.

Another example relates to a system that includes a non-transitory memory that stores machine-readable instructions and a processing unit that accesses the memory and executes the machine-readable instructions. An IC test engine generates a plurality of single cycle test patterns that target a plurality of static single cycle faults and/or defects of an IC chip based on an IC design. The IC test engine can fault simulate the plurality of single cycle test patterns against a plurality of multicycle faults and/or defects in the IC design that are based on a plurality of fault rules files for the IC design. Each of the plurality of fault rules files is associated with a respective cell type of a plurality of cell types in the IC design, and a given single cycle test pattern of the plurality of single cycle test patterns is sim-shifted to enable detection of a given multicycle fault and/or defect of the plurality of multicycle faults and/or defects.

Yet another example relates to a method for generating test patterns for testing a fabricated IC chip. The method includes generating, by an IC test engine executing on a computing platform, a plurality of single cycle test patterns that target a plurality of static single cycle faults and/or defects of a fabricated IC chip based on an IC design. The method also includes fault simulating, by the IC test engine, the plurality of single cycle test patterns against a plurality of multicycle faults and/or defects in the IC design. A given single cycle test pattern of the plurality of single cycle test patterns is sim-shifted to enable detection of a given multicycle fault and/or defect of the plurality of multicycle faults and/or defects.

BRIEF DESCRIPTION OF THE DRAWINGS

FIG. 3 illustrates an example of a defect detection matrix (DDM) for a cell.

DETAILED DESCRIPTION

Figure 1:
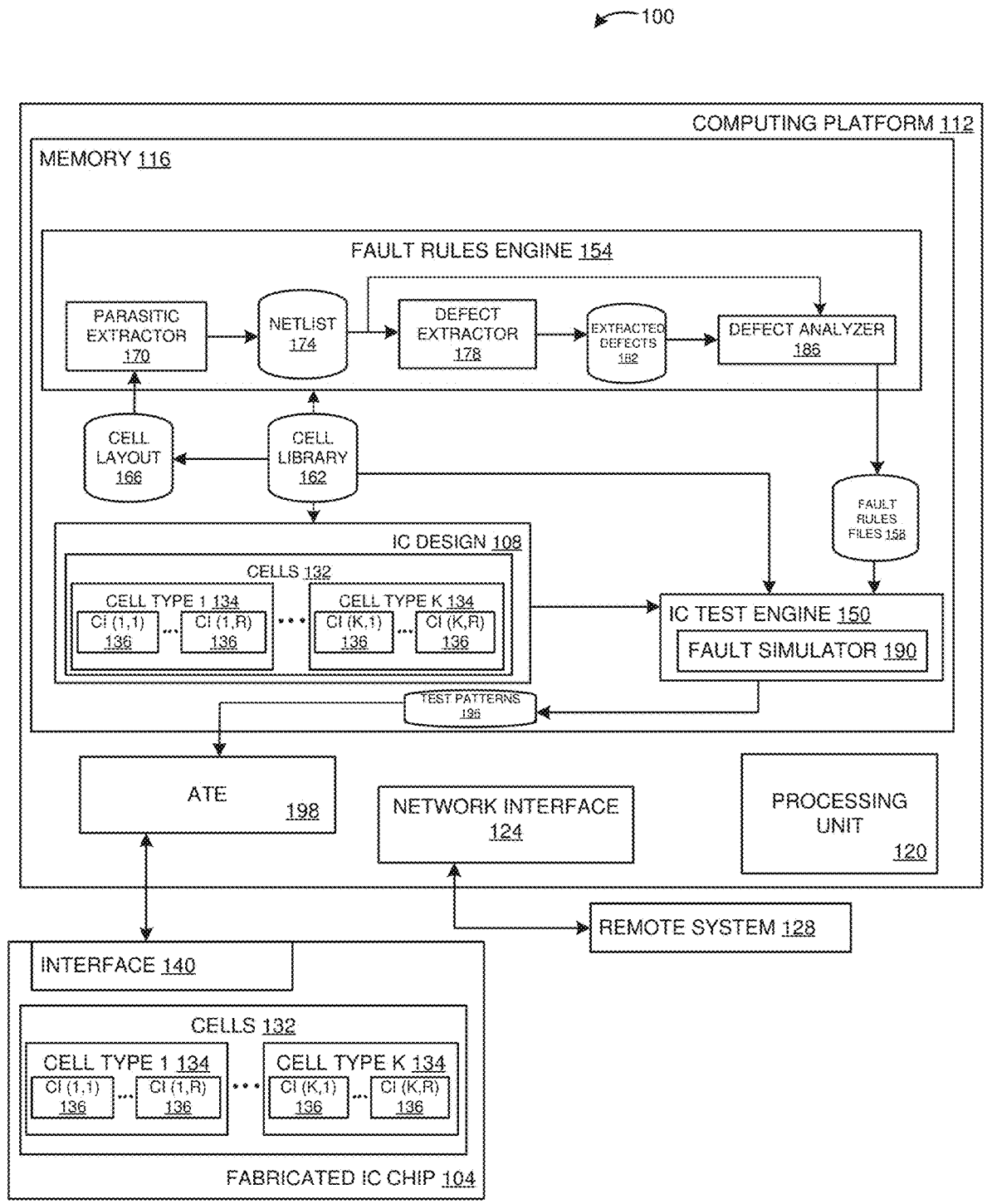
FIG. 1 illustrates an example of a system for testing a fabricated IC chip that is based on an IC design.

This disclosure relates to a system for employing ATPG techniques to generate test patterns for an IC chip design. A test pattern targets candidate faults/defects of the IC design. Some test patterns, referred to as boundary model test patterns, test a candidate fault/defect at a boundary of a cell of the IC chip, where faults/defects can be referred to as boundary model fault/defects. Other test patterns, referred to as cell-aware test patterns test for a candidate fault/defect inside a cell of the IC chip, where defects can be referred to as cell-aware defects. Cell-aware defects can be physically correlated to actual observed fabrication errors. For instance, bridge defects that can cause an unintended short or low-resistance connection, and open defects that can cause an unintended disconnection, for example are typically of highest interest. The cell-aware test patterns are based on a plurality of fault rules files for the IC design. Each of the fault rules files is associated with a respective cell type of a plurality of cell types in the IC design.

In the examples provided, an IC test engine employs ATPG techniques to generate test patterns. Some of the test patterns can be single cycle test patterns, and other test patterns can be multicycle test patterns for testing faults/defects in the IC design. A single cycle test pattern has only one clock pulse during a capture window and a multicycle test pattern has two or more clock pulses during the capture window to detect faults/defects. For each such test pattern (single cycle or multicycle), the capture window is preceded by a shift window which include one or more scan shift cycles. A single cycle test pattern can detect static faults/defects and has only one clock pulse during the capture window where scan/shift enable is typically de-asserted. The last scan shift cycle prior to the capture window sets the correct static conditions to detect a fault or defect (fault excitation) while the clock pulse during the capture window (capture pulse) allows observing the fault effect on a primary output or observable scan flop(s). A multicycle test pattern employs two or more cycles to detect faults/defects during the capture window. The last clock pulse during the capture window of a multicycle test pattern is defined as a capture cycle while the prior cycles are defined as launch cycles (or release cycles). The launch cycle creates the transition (fault excitation) at the fault site required to detect a fault or defect while the capture cycle observes the transition on a primary output or an observable scan flop. The last scan shift cycle in the shift window sets the initial values (fault initialization) which enables the creation of the transition during the launch cycle.

In some examples, the IC test engine executing on a computing platform can generate a first set of test patterns using ATPG techniques. The first test patterns can include single cycle boundary model test patterns. Each single cycle test pattern of the first set of test patterns can target a particular set of static single cycle boundary model faults/defects in the fabricated IC chip.

The IC test engine can employ a fault simulator to fault simulate the first set of test patterns against static single cycle cell-aware defects in the IC design. The IC test engine can mark-off the static single cycle cell-aware defects that are detectable by the first set of test patterns (single cycle boundary model test patterns targeting static single cycle boundary model faults/defects) through serendipitous fault detection. Additionally, the IC test engine can employ the fault simulator to fault simulate the first set of test patterns against static multicycle cell-aware defects through sim-shifting.

Sim-shifting a single cycle test pattern entails fault simulating one or more scan shift cycles prior to the capture pulse as a fault initialization and excitation cycles and employing the capture pulse as a fault observation cycle to detect a fault/defect which otherwise requires multiple clock pulses during the capture window. If the fault excitation creates the transition required to detect the fault/defect and the final state of the transition can be observed during the capture pulse, then sim-shifting results in that fault/defect detection. In this manner, the single cycle test pattern mimics the operation of a multicycle test pattern for a static multicycle defect (e.g., a static cell-aware defect), such that the same single cycle test pattern is employable to detect single cycle defect(s) and multicycle defect(s). Stated differently, sim-shifting of the single cycle test pattern enables such single cycle test patterns to detect multicycle faults/defects (such as multicycle cell-aware defects) that conventionally are only detectable with a multicycle test pattern. More particularly, the systems and methods described herein enable fault simulation to recognize that single cycle test patterns are employable to detect multicycle faults/defects, and to assign appropriate credit to the single cycle test patterns, which obviates the need to explicitly target multicycle defects and generate unnecessary multicycle tests. The static multicycle cell-aware defects that are detectable with the first set of test patterns, which are single cycle boundary model test patterns targeting static boundary model single cycle faults/defects, are marked-off. Marking-off the static single cycle cell-aware defects and the static multicycle cell-aware defects avoids unneeded generation of test patterns specifically targeting these marked-off static single cycle cell-aware defects and static multicycle cell-aware defects. As used herein, the term "marked-off" (and its derivatives) is synonymous with "marked as tested", such that a marked-off fault/defect does not need further testing.

Additionally, in some examples, the IC test engine can generate a second set of test patterns using ATPG techniques. The second set of test patterns are top-off test patterns that target untested (e.g., non-marked-off) single cycle cell-aware defects. Additionally, the IC test engine can employ the fault simulator to fault simulate the second set of test patterns against untested static multicycle cell-aware defects through sim-shifting. Furthermore, the IC test engine can generate a third set of test patterns using ATPG techniques. The third set of test patterns can be multicycle test patterns that target untested static cell-aware multicycle patterns.

The IC test engine can aggregate the first set of test patterns, the second set of test patterns and the third set of test patterns to provide test patterns to an ATE. Responsive to the test patterns, the ATE can apply the test patterns to the fabricated IC chip. By employing the techniques described herein, the number of faults detected by the application of the test patterns is increased without requiring an increase in a number of the test patterns.

FIG. 1 illustrates an example of a system 100 for testing a fabricated IC chip 104 that is based on an IC design 108. The system 100 can include a computing platform 112. Accordingly, the computing platform 112 can include a memory 116 for storing machined readable instructions and data and a processing unit 120 for accessing the memory 116 and executing the machine-readable instructions. The memory 116 represents a non-transitory machine-readable memory (or other medium), such as random access memory (RAM), a solid state drive, a hard disk drive or a combination thereof. The processing unit 120 can be implemented as one or more processor cores. The computing platform 112 can include a network interface 124 (e.g., a network interface card) configured to communicate with other computing platforms via a network, such as a public network (e.g., the Internet), a private network (e.g., a local area network (LAN)) or a combination thereof (e.g., a virtual private network).

The computing platform 112 could be implemented in a computing cloud. In such a situation, features of the computing platform 112, such as the processing unit 120, the network interface 124, and the memory 116 could be representative of a single instance of hardware or multiple instances of hardware with applications executing across the multiple of instances (e.g., distributed) of hardware (e.g., computers, routers, memory, processors, or a combination thereof). Alternatively, the computing platform 112 could be implemented on a single dedicated server or workstation.

The IC design 108 can be stored in the memory 116 of the computing platform 112. The IC design 108 can be implemented, for example, as design specifications for an IC chip. The IC design 108 can be generated with an electronic design automation (EDA) application operating on a remote system 128, such as a logic synthesis application (e.g., a synthesis tool). For instance, an end-user of the EDA application can employ a user-interface to generate and/or modify hardware description language (HDL) code (e.g., Verilog) for generating a register-transfer level (RTL) model (e.g., RTL code) characterizing a circuit, wherein the RTL model is transformable by an EDA application into a physically realizable gate-level netlist for the IC design 108.

As noted, in the examples described, the fabricated IC chip 104 represents a physically instantiated version of the IC design 108. More particularly, the fabricated IC chip 104 and the IC design 108 can include intellectual property (IP) blocks formed of cells 132. Each of the cells 132 (alternatively referred to as standard cells), can represent a group of transistor and interconnect structures that provides a Boolean logic function (e.g., AND, OR, NOR, NAND, XOR, XNOR, inverters) or a storage function (e.g., flipflop or latch). The cells 132 of the fabricated IC chip 104 represent physically instantiated versions of the cells 132 of the IC design 108. Thus, the cells 132 of the IC design 108 and the cells 132 of the fabricated IC chip 104 employ the same reference numbers. In many instances, there can be virtually any number of cells 132 (e.g., hundreds, thousands or millions).

In the present example, there are K number of different cell types 134 of the cells 132, where K is an integer greater than or equal to one. Additionally, there are R number of cell instances 136 for each of the K number of cell types 134, where R is an integer greater than or equal to one. Each cell instance 136 represents a specific instantiation in the IC design 108 for a corresponding cell type 134. Moreover, there can be a different (or the same) number of cell instances 136 for each of the K number of cell types 134.

For purposes of simplification of explanation, each of the cell instances 136 includes a unique identifier implemented as a two-dimensional index number, i,j, where i identifies the cell type 134 and j identifies the cell instance number for the cell type 134. For instance, the cell instance 136 labeled as CI (1,R) uniquely identifies the Rth cell instance of cell type 1. Similarly, the cell instance 136 labeled as CI (K,1) uniquely identifies the first cell instance 136 of the Kth cell type 134.

The fabricated IC chip 104 can include an interface 140 that enables external systems to provide stimuli to the components of the fabricated IC chip 104, including the cells 132 of the fabricated IC chip 104. The interface 140 can conform to the standards set forth in the IEEE 1149.1 standards, IEEE 1149.6 standards, and can be implemented with PCI, wafer probes, etc.

The memory 116 includes an IC test engine 150 which can be implemented as application software or a software module. The IC test engine 150 is configured to generate and execute employ ATPG techniques to generate boundary model and cell-aware test patterns that can be applied to the fabricated IC chip 104 to ensure proper operation.

The IC test engine 150 can operate in concert with a fault rules engine 154 stored in the memory 116. The fault rules engine 154 can be configured/programmed to generate fault rules files 158. In some examples, the fault rules engine 154 generates Defect Detection Matrices (DDMs) that each represents a user-readable format of a corresponding fault rules file 158. Each fault rules file 158 represents a set of fault rules for a particular cell type 134 of the K number of cell types 134 that is selected from a cell library 162. The cell library 162 can include, but is not limited to, data characterizing a physical layout of each of the K number of cell types 134 in the cells 132 of the IC design 108 and the fabricated IC chip 104. The cell library 162 can also include structural Verilog (.v), behavioral Verilog (.v) and timing models (.lib).

To generate the fault rules files 158, the fault rules engine 154 can read a cell layout 166 from the cell library 162. The cell layout 166 corresponds to a physical layout view of the standard cell type 134 in terms of mask polygons containing the geometrical data required to instantiate the fabricated IC chip 104. The fault rules engine 154 generates a particular fault rules file 158 of the fault rules files 158 based on the cell identified in the cell layout 166.

The fault rules engine 154 can represent a plurality of software applications that operate in an ordered sequence to generate each instance of the fault rules file 158. In particular, the cell layout 166 can be received by a parasitic extractor 170. The parasitic extractor 170 generates a transistor-level netlist 174 of the cell represented by the cell layout 166. The parasitic extractor 170 utilizes the cell layout 166, along with other fabrication technology-related information available in the cell library 162 to generate the transistor level netlist 174. The netlist 174 is a textual description of the standard cell type 134 in terms of its designed devices (e.g., transistors), input output pins and their inter-connections. The netlist 174 also includes unavoidable parasitic resistors (Rs) and capacitors (Cs) inherent to a standard cell type 134 extracted by the parasitic extractor 170. The parasitic resistors, for example, can be extracted on the wires and inter-connects and for the terminals of a transistor e.g. drain, gate, source, bulk. The parasitic extractor 170 can extract parasitic capacitors between wires on the same layer (intra-layer), between layers (inter-layer) or across transistor terminals e.g. drain-gate, drain-source, bulk-drain, etc. The netlist 174 can be provided in the Detailed Standard Parasitic Format (DSPF).

The fault rules engine 154 can include a defect extractor 178 that can analyze the netlist 174 to identify parasitic resistors and capacitors to be modeled as potential open and short defects for the standard cell type 134 to provide extracted defects 182. The extracted defects 182 can include data for modeling each of the defects identified in the netlist 174. For instance, a large parasitic resistor indicates a long and thin wire segment that can undergo an unintended break, and hence is a potential 'open' defect site. A large parasitic capacitance between two nets or wire segments indicates that the two nets or wires are relatively close to one another and along a relatively long distance, hence can be potentially shorted. An open defect is modeled with a high ohmic resistance (e.g. 1 G Ohm), and a short is modeled with a very low resistance (e.g., 0.001 Ohm).

The extracted defects 182 from the netlist 174 can be provided to a defect analyzer 186 that characterizes each of the extracted defects 182 in the netlist 174. More particularly, the defect analyzer 186 simulates operation of a circuit representing the cell layout 166 for each instance of the extracted defects 182. For example, the defect analyzer 186 can simulate operation of the circuit representing a particular cell with each parasitic capacitor and/or resistor being set to a defect free value, and open or a short. The defect analyzer 186 can identify transition faults/defects as well as static faults/defects in one of the K number of cell types 134 characterized by the cell layout 166. Transition faults/defects characterize faults/defects wherein a component within the cell reaches an expected value slower than is acceptable. Conversely, static faults/defects refer to faults/defects that cause a circuit component to not reach an expected value within the typically used tester cycle period (e.g. 20 ns for a 50 MHz tester cycle). Throughout this disclosure, unless otherwise noted the faults/defects analyzed by the defect analyzer 186 refer to static faults/defects. The defect analyzer 186 outputs an instance of the fault rules file 158 based on the results of the analysis. The fault rules engine 154 can repeat operations to iteratively generate the fault rules files 158 for each cell type 134 in the K number of cell types 134.

Figure 2:
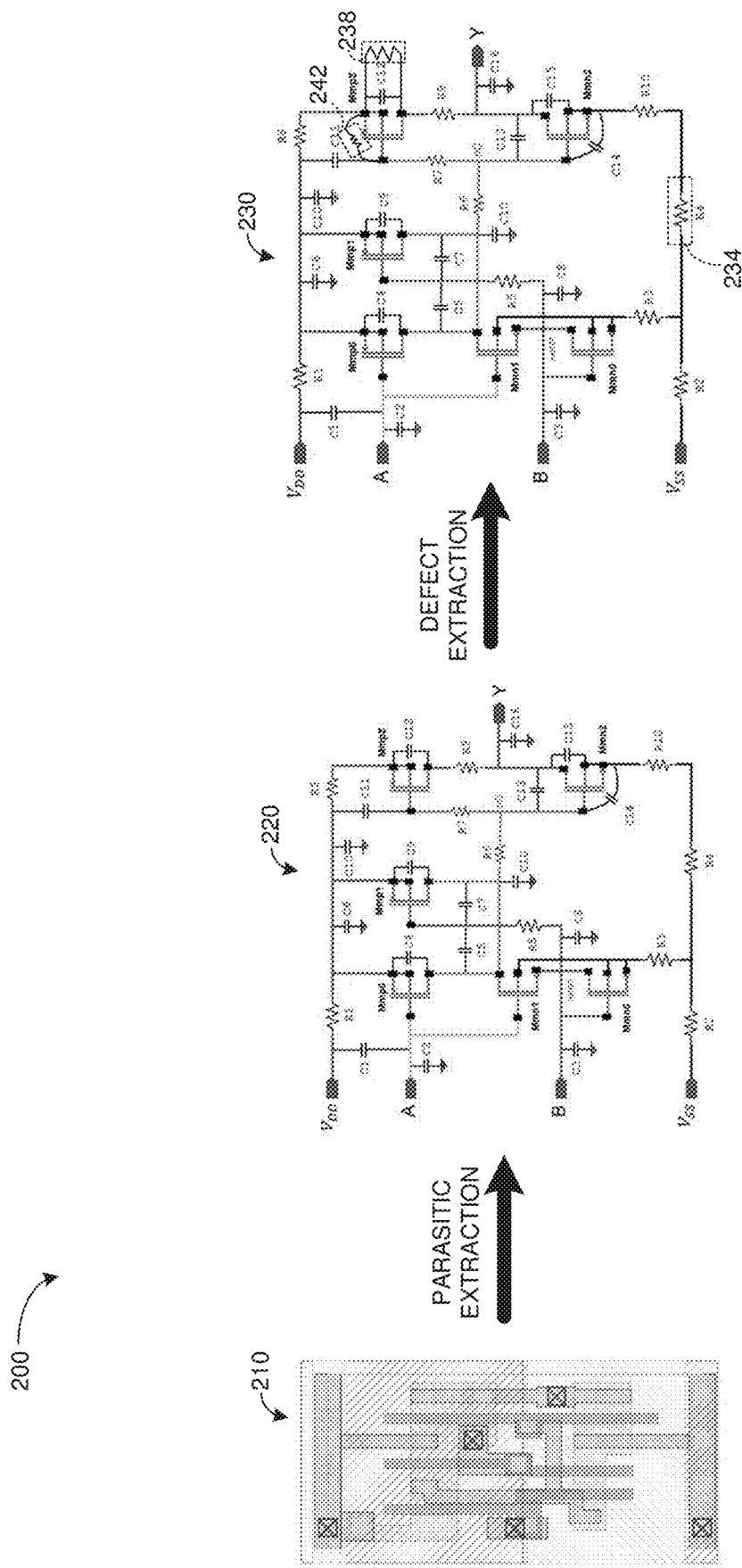
FIG. 2 illustrates diagrams depicting a flow for extracting potential faults/defects in a cell.
Figure 3:
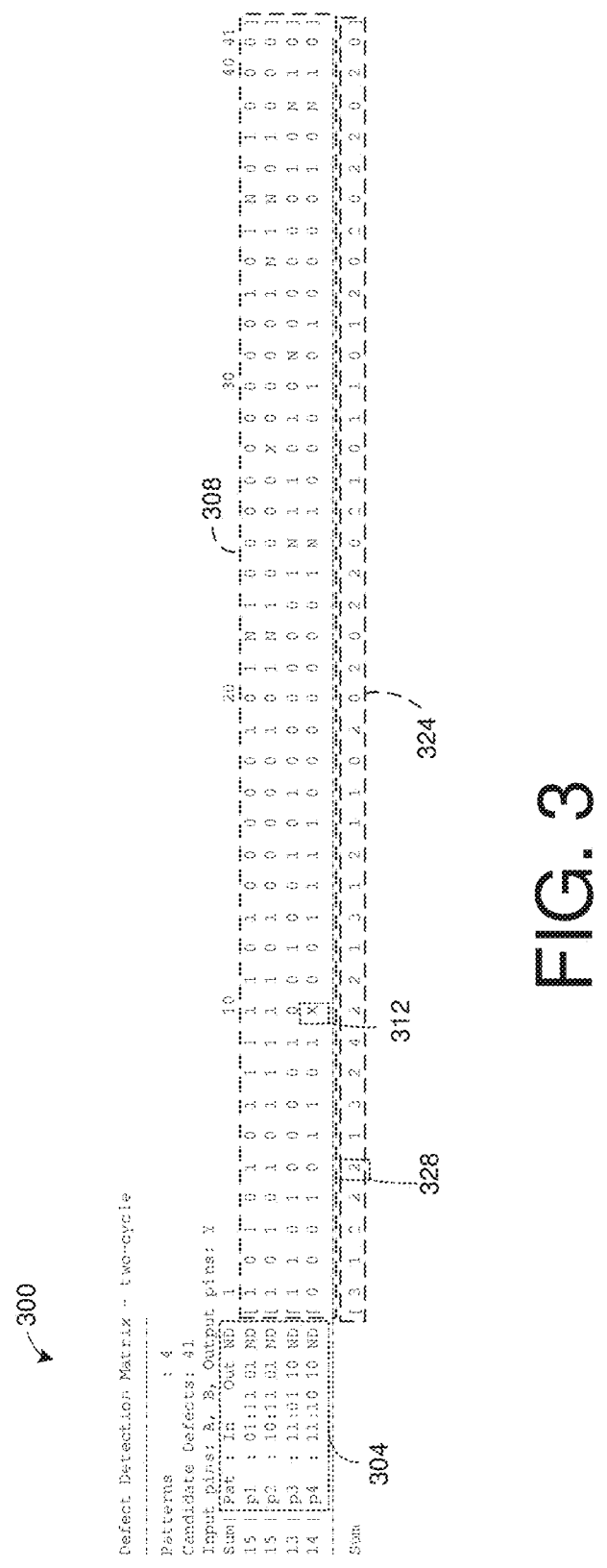
Figure 4:
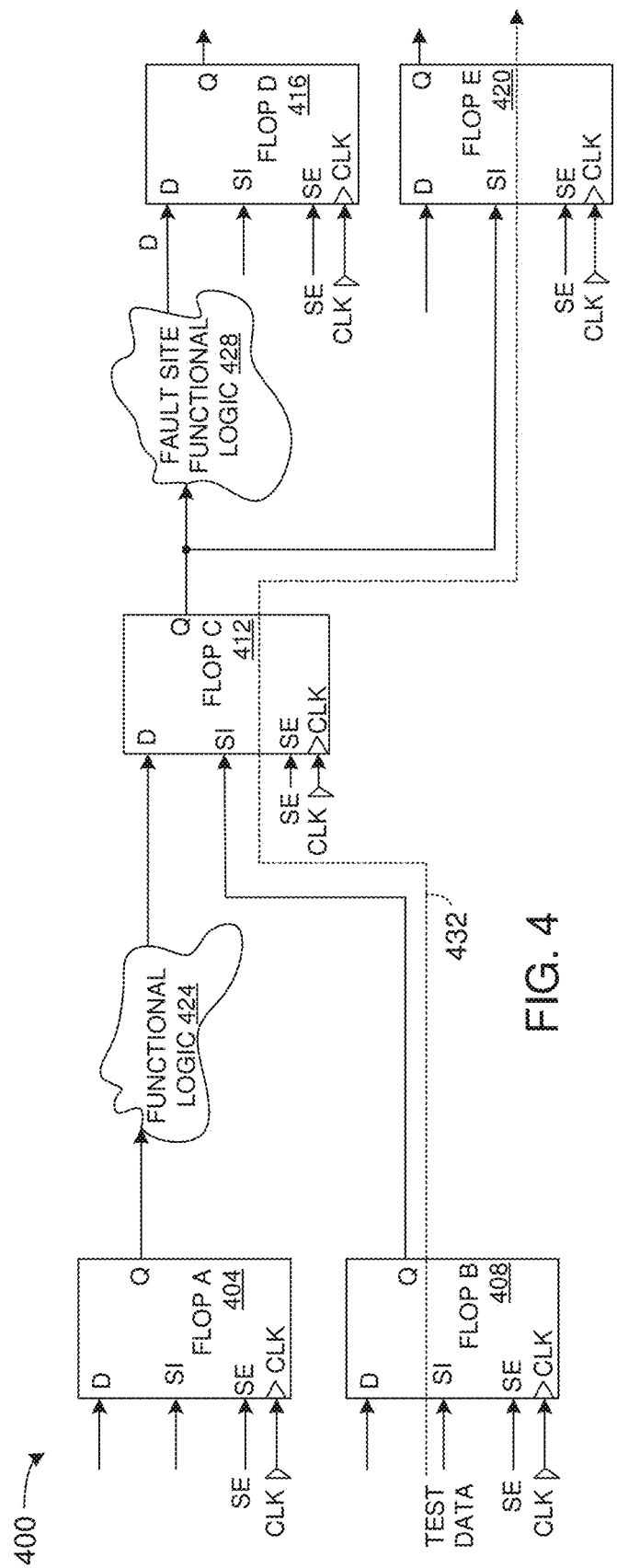
FIG. 4 illustrates an example of a scan chain for testing a candidate fault/defect in an IC design.

To facilitate understanding of the operations of the fault rules engine 154, a given extended example ("the given example") is provided and explained with respect to FIGS. 2-4. The given example illustrates and describes how a fault rules file can be generated for an AND gate cell.

FIG. 2 includes diagrams depicting a flow 200 for extracting potential defects in a cell in the given example. FIG. 2 includes a physical cell layout 210 for an AND gate. The physical cell layout 210 characterizes the physical layout of an IC chip that physically instantiates the AND gate. More particularly, the physical cell layout 210 includes connection points and traces that form the AND gate.

A parasitic extractor, such as the parasitic extractor 170 of FIG. 1 can analyze the physical cell layout 210 to generate a transistor-level netlist of the physical cell layout 210. The transistor-level netlist provides data sufficient to generate a circuit diagram 220 for the physical cell layout 210. The parasitic extractor analyzes the netlist to identify and extract parasitic components in the cell represented by the circuit diagram 220. These parasitic resistors and capacitors are not intended by the designer of the cell, but exist in a fabricated IC chip that employs the cell. Parasitic capacitance, or stray capacitance is an unavoidable (and usually unwanted) capacitance that exists because of a proximity of circuit components, such as wires, interconnects between transistor terminals, etc. Similarly, all conductors (e.g. wires, interconnects) in the physical cell layout 210 possess some unavoidable parasitic resistance. The parasitic extractor extracts (or models) these parasitic resistors and capacitors in the circuit diagram 220. In this manner, the parasitic extractor generates an accurate analog model for the physical cell layout 210 that is characterized in the circuit diagram 220, which analog model is employable to emulate circuit responses in detailed simulations of the circuit diagram 220.

The parasitic extractor identifies (marks) node in the netlist with the parasitic components that coincide with possible defect sites. Thus, the parasitic extractor augments the netlist with data that includes the identification of parasitics extracted from the netlist. In the given example, the parasitic extractor analyzes the circuit diagram 220 to provide a circuit diagram 230 that includes specific identification of a resistor R4 234 in the netlist as a parasitic component.

The netlist in DSPF that identifies parasitics can be provided to a defect extractor, such as the defect extractor 178 of FIG. 1. The defect extractor employs the parasitics identified in the netlist to model potential open and short defects within a standard cell. More particularly, the defect extractor can analyze the identified parasitics and generate a fault model for each identified parasitic in the netlist, or some subset thereof. Additionally, the defect extractor searches the circuit diagram 220 to identify nets that are relatively long which could form a parasitic resistor and/or nets that are relatively close and running parallel over long distance, which could form a parasitic capacitor. These parasitic capacitors have a high probability of corresponding to probable short and open locations as a result of defects induced during fabrication. That is, the defect extractor can identify locations in the netlist that have a higher probability of corresponding to manufacturing defects.

The fault model for each parasitic resistor can represent an instance of a circuit design wherein a respective parasitic resistor is modeled as an open (e.g. a resistor with a resistance of 1 G Ohm). Examples of such modeled opens can include, but are not limited to opens at a drain, gate, source and bulk terminals on FETs, and opens on each branch of interconnected nets including signaling nets and between power-ground nets. Additionally, the fault model for each parasitic capacitor can be represented as an instance of the circuit design wherein a respective parasitic capacitor is modeled as a short (e.g., a resistor with a resistance of 0.001 Ohms). The examples of such modeled shorts can include, but are not limited to shorts across FET terminal pairs, including drain-source, drain-gate, source-gate, bulk-drain, bulk-gate and bulk-source pairs. The examples of such model shorts also include shorts across each possible interconnected net pairs, signal nets on the same layer (e.g., intralayer shorts), shorts between power-ground nets (e.g., power-ground shorts) and shorts between adjacent layers (e.g., inter-layer shorts). The defect extractor can provide extracted defects, such as the extracted defects 182 of FIG. 1 that identifies the location of defects modeled by the defect extractor. In the given example, the resistor R4 234 can be modeled as an open circuit in one fault model of the circuit design. In another fault model of the circuit design, the capacitor C12 238 or the transistor terminals of MMP2 242 can be modeled as a short. That is, the defect extractor generates multiple versions of a circuit representing a cell, wherein each version (a fault model) includes an open or a short replacing a particular parasitic resistor or parasitic capacitor. During execution of this analysis, each cell is evaluated in isolation, outside of the context of the full IC design. Each cell input is assumed to be directly controllable and independent from other cell inputs. Each of the fault models can be aggregated into the extracted defects that can be provided to a defect analyzer, such as the defect analyzer 186 of FIG. 1.

The defect analyzer can employ the extracted defects characterized with fault models to generate a DDM and a fault rules file that characterizes a detectability of each fault identified in the netlist, or some subset thereof. More particularly, the defect analyzer can employ fault analysis to generate the DDM and the fault rules file for the cell. In the given example, it is presumed that there are 41 potential faults. The defect analyzer applies a set of two-cycle test patterns for each potential fault to determine whether a fault is detectable, and if the fault is detectable, to determine if the fault is a static defect or a transient fault. Moreover, if the fault is a static fault, the defect analyzer can determine if the fault is detectable with a single cycle test pattern or if a multicycle test pattern is needed.

In the given example, the circuit diagram 220 includes input nodes labeled A and B and an output node labeled Y. As noted, in the given example, the cell represents an AND gate. Thus, an instance of the cell with no faults/defects should provide an output of a logical one on node Y if, and only if nodes A and B have a logical one applied there-on. Additionally, node Y should output a logical 0 for all other combinations of logical values applied to nodes A and B. To generate the DDM and the fault rules file, the defect analyzer simulates instantiations of the cell that have particular faults/defects and analyzes whether a particular fault/defect impacts an output of a cell based on the application of two-cycle test patterns applied to the input nodes (nodes A and B in the given example). The defect analyzer can be configured to apply multiple two-cycle test patterns for each candidate fault/defect identified in the netlist. The results can be aggregated to form a DDM and a fault rules file for the cell.

FIG. 3 illustrates an example of a DDM that could represent the cell (an AND gate) in the given example. In the DDM 300, a first box 304 identifies and characterizes four two-cycle test patterns, labeled p1 . . . p4. For instance, in the given example, the two-cycle test pattern p1 is labeled as (In) 01:11, (Out) 01 and (ND) "ND". This labeling indicates that in a first test pattern, a logical 0 is applied to node A, and a logical 1 is applied to node B, and that an expected response at the output node, Y is a logical 0. Additionally, this labeling also indicates that in a second test pattern, a logical 1 is applied to node A and to node B, and that the expected response at the output node, Y is a logical 1. Furthermore, the labeling "ND" of p1 represents a recorded nominal delay, Delay$_{nom}$ for the test pattern, p1 (e.g., the transition delay for a defect-free version of the cell). Values at "ND" are stored as integer or fixed point/floating point values. Moreover, in some examples, the nominal delay, Delay$_{nom}$ can be omitted.

Additionally, the DDM 300 includes a 41 by 4 results matrix 308 wherein each of the 41 columns represents a recorded result of a corresponding two-cycle test pattern for a particular candidate fault/defect. That is, each column represents a response to four two-cycle test patterns, p1 . . . p4 by a particular version of the cell where one fault/defect is modeled. Values in the results matrix 308 of the DDM 300 recorded as a 0 indicate that the particular fault/defect did not have a detectable change on the operation of a cell for a corresponding test pattern. For instance, the value stored in the results matrix 308 at column 3, row 3 indicates that the two-cycle test pattern p3 (11:01; 10; "ND") in the first box 304 has a value of 0. This indicates that the two-cycle test pattern, p3 is not employable to detect the particular candidate fault/defect modeled in column 3.

Additionally, values in the results matrix 308 of the DDM 300 recorded as a 1 indicate that the particular fault/defect is a static fault/defect detected by the corresponding test pattern. For instance, the value stored at column 4, row 4 indicates that the two-cycle test pattern p4 (11:10; 10; "ND") has a value of 1. This indicates that the two-cycle test pattern, p4 is employable to detect static fault/defect for the particular candidate fault/defect model in column 4.

A recorded value of 'X' in the results matrix 308 indicates that the corresponding test pattern is not employable to detect a fault/defect caused by the candidate fault/defect of the corresponding column due to non-convergence, where the solution from fault analysis was indeterminant. Furthermore, in the given example, the value at column 10, row 4 in a second box labeled 312 is set to 'X', indicating that due to non-convergence, two-cycle test pattern p4 is not employable to detect a fault/defect caused by the particular candidate fault/defect modeled in column 10. Further, a recorded value of 'N' represents a percent deviation or a time deviation (e.g., in μs, ns or ps) from a corresponding nominal delay 'ND' caused by applying a corresponding test pattern for a particular candidate fault/defect. Moreover, in some examples, the values of 'N' may be omitted.

The DDM 300 also includes a one row sum matrix 324 that stores integer values characterizing a number of test patterns p1 . . . p4 that are employable to detect a particular static fault/defect. For instance, in a box 328, a value of 2 is stored at column 5 of the one row sum matrix 324 of the DDM 300. This value indicates that two different two-cycle tests (namely p1 and p2) are employable to detect the candidate fault/defect modeled in column 5. As noted, the defect analyzer generates a fault rules file that corresponds to the DDM 300. The fault rules file provides similar information as the DDM 300 in a format consumable by an IC test engine, such as the IC test engine 150 of FIG. 1.

Referring back to FIG. 1, the fault rules files 158 for each of the K number of cell types 134 of the cells 132 included in the IC design 108 are provided to the IC test engine 150 for the generation of test patterns for the fabricated IC chip 104 using ATPG techniques. The test patterns generated by the IC test engine 150 include both boundary model test patterns (e.g., non cell-aware test patterns) and cell-aware test patterns. Some test patterns are considered "cell-aware" because the cell-aware test patterns are generated based on candidate faults/defects within boundaries of the cells 132 of the IC design 108. That is, rather than the boundary model test patterns that treat each cell as a "black box", the cell-aware test patterns that are generated by the IC test engine 150 are tailored for specific candidate faults/defects that are possible based on the internal circuit design of cells.

As used herein, defects or faults that are characterized as "single cycle" refer to defects and faults, respectively in the fabricated IC chip 104 and the IC design 108 that are detectable with a single cycle test pattern. Additionally, defects or faults that are characterized as "multicycle" refer to defects and faults, respectively in the fabricated IC chip 104 and the IC design 108 that require a value transition (or multiple value transitions) for testing and are conventionally only detectable with a multicycle test pattern. However, through sim-shifting, single cycle test patterns generated by the IC test engine 150 are employable to detect both single cycle defects and faults as well as multicycle defects and faults. More particularly, the single cycle test patterns are sim-shifted such that a scan shift cycle prior to a capture cycle of the given single cycle test pattern could create a transition, also referred to as fault excitation, that is needed to detect particular multicycle faults/defects and the capture cycle enables observation of the transition on a primary output pin or at an observable scan flop. Additionally, the shift cycles prior to the last shift cycle may be fault simulated for multicycle defects which require two or more cycles for detection.

A single cycle test pattern has one or more scan shift cycles when shift enable is asserted (shift window) and a single capture cycle (e.g., a single clock pulse) where shift enable is de-asserted (capture window). A multicycle test pattern includes one or more shift cycles (shift window) and N capture cycles (capture window), where N is an integer greater than or equal to two. Moreover, a cycle (e.g., cycle N−1) during the capture window in a multicycle test pattern is the fault excitation cycle which creates the transition on a cell pin (e.g., alternatively referred to as a cell node) needed to detect a fault or defect and another cycle (e.g., cycle N) captures the transition on a primary output pin or on an observable scan flop (or multiple observable scan flops). Additionally, the remaining cycles of the capture window, namely cycle 1 to cycle N−2, are fault initialization cycles which facilitate the needed conditions for the fault or defect to be detected. More specifically, the cycle N−1 is also referred to as a launch cycle that creates the transition on the node of a cell needed to detect a fault or defect. Furthermore, the cycle N is also referred to as a capture cycle which captures (or observes) the fault or defect on a primary output pin or observable scan flop(s). As one example, in a two-cycle test pattern (such that N is equal to 2), the capture cycle is cycle 2 (cycle N), and the launch cycle is cycle 1 (cycle N−1). As another example, in a three-cycle test pattern (such that N is equal to 3), the capture cycle is cycle 3 (cycle N), the launch cycle is cycle 2 (cycle N−1), and cycle 1 is the fault initialization cycle. In still another example, in a ten cycle test pattern (such that N is equal to 10), the capture cycle is cycle 10 (cycle N), the launch cycle is cycle 9 (cycle N−1) and cycles 1-8 (cycles N−(N−1) to N−2) are fault initialization cycles.

In some examples, a first set of the test patterns are single cycle boundary model test patterns. The first set of test patterns are generated to test for a specific set of single cycle static faults or defects in the fabricated IC chip 104 (e.g. boundary model static faults). The second set of test patterns are generated to test for a specific cell-aware static defect in the fabricated IC chip 104.

A scan chain is formed of scan flops that are included in the IC design 108 to propagate test patterns through the IC design 108. Moreover, some such static faults/defects require multiple cycles of data to propagate a value to a cell 132 that contains potential faults/defects. The IC test engine 150 includes a fault simulator 190 that is activated and deactivated during processing of a test pattern. The fault simulator 190, if activated, verifies that particular values of the test pattern are loaded into the cells 132 in a manner that allows a candidate fault/defect to be detected. Activation of the fault simulator 190 is relatively computationally expensive, such that the IC test engine 150 is configured to disable the fault simulator 190 in times when grading test pattern effectiveness at detecting faults is not needed.

A single cycle test pattern has one or more scan shift cycles to load one or more scan chains with desired values during shift windows, followed by a single (slow) capture pulse to capture a fault effect into the observable scan flops and then shifting out the captured values through the scan chains to scan outputs. The value loaded by the last scan shift into the scan flops provides the conditions needed to excite the static fault to be tested. The design is put in functional mode during the capture window and the capture cycle observes the fault effect at an observable scan flop. The capture cycle puts the design in functional mode and captures the fault effect into the scan flop.

Conversely, a multicycle test pattern has one or more scan shift cycles to load one or more scan chains with desired values during the shift window, followed by two or more capture pulses during the capture window to observe the fault effect at observable scan flops and then shifting out the captured values through the scan chains to scan outputs. In a multicycle test pattern, the values loaded by the last scan shift into the scan flops provide the needed fault initialization values while the first capture clock pulse (launch) creates a transition on the cell input. The second capture cycle (capture) observes the fault effect into the observable scan flop. Static fault detection typically employs a single cycle test pattern, whereas delay fault detection conventionally requires an at-speed multicycle test pattern. The clock pulses in the capture window of an at-speed multicycle pattern are fast clock cycles using a functional clock period. There are some static cell-aware defects which are only detectable with multicycle test patterns. The clock pulses during the capture window in such cases may be slow and use the same clock period as the shift clock cycle period.

As noted, each test pattern in the first set of test patterns is generated to test for a specific candidate fault/defect, namely, a specific static fault/defect in the IC chip 104. Moreover, the fault simulator 190 of the IC test engine 150 can be configured to fault simulate the first set of test patterns to determine if any test patterns in the first set of test patterns are employable to detect other single cycle static faults/defects in the fabricated IC chip 104 through serendipitous fault detection. For instance, presume that a given single cycle test pattern of the first set of test patterns tests for a boundary model stuck-at 0 on an output Y of an AND gate (e.g., for a boundary model of the AND gate of the given example). In this situation, the given single cycle test pattern could be input A=1 and input B=1. The fault simulator 190 could fault simulate the given single cycle test pattern against single cycle static cell-aware defects to determine if the single cycle test pattern is employable to detect a single cycle static cell-aware defect or multiple single cycle-cell aware defects through serendipitous fault detection. If any such single cycle cell-aware static defects are detectable with the given single cycle test pattern, these other cell-aware static defects can be marked-off for fault detection by the IC test engine 150. Accordingly, the IC test engine 150 does not need to generate specific test patterns for the single cycle static cell-aware defects that are marked-off (because of serendipitous fault detection) since the given single cycle test pattern is employable to detect them. Accordingly the IC test engine 150 can examine each cell instance 136 to determine which, if any, test patterns and/or candidate faults/defects should be filtered (not generated or removed, respectively) based on the first set of test patterns generated for testing candidate faults/defects of the IC design 108.

Additionally, the fault simulator 190 can apply sim-shifting to each single cycle test pattern in the first set of test patterns to determine which, if any of the first set of test patterns are employable to detect multicycle cell-aware static defects. The sim-shifting of a given single cycle test pattern causes a window of time that the fault simulator 190 verifies the values loaded by the given single cycle test pattern to move such that the given single cycle test pattern mimics operation of a multicycle test pattern. More particularly, sim-shifting the given single cycle test pattern causes the IC test engine 150 to activate the fault simulator 190 at least one clock cycle prior to a static capture interval. Accordingly, the sim-shifted single cycle test pattern causes a transition at a cell 132 of the IC design 108 with a candidate fault/defect during a scan-in shift interval of the test pattern. As an example of this concept, FIG. 4 illustrates an example of a partition of an IC design 400 that is employable in the IC design 108 for propagating a test pattern.

The IC design 400 includes five scan flops (labeled "flop"), namely, scan flop A 404, scan flop B 408, scan flop C 412, scan flop D 416 and observable scan flop E 420. Scan flop B 408, scan flop C 412 and scan flop E 420 are connected to each other in a scan chain 432. Scan flop A 404 and scan flop D 416 are part of other scan chains in the IC design 400. Each scan flop includes a data input port, (labeled D), a scan-input port (labeled SI), a scan enabled port (labeled SE) and a clock input port (labeled CLK). Additionally, each scan flop includes an output port (labeled Q). For purposes of simplification of explanation, some termination points and interconnections are omitted. For instance, in the present example, it is presumed that scan flop A 404, scan flop B 408, scan flop C 412, scan flop D 416 and scan flop E 420 each receive the same scan enable signal, SE and the same clock signal, CLK.

The output port, Q of flop A 404 is provided to functional logic 424 (represented as a cloud), and the output of the functional logic 424 is provided to the data input, D port of scan flop C 412. The functional logic 424 can represent functional logical operators (e.g., gates, or sequential logical operations) formed by cells that execute function of an IC design. The output port, Q of the scan flop B 408 is provided to the scan-in port, SI of the scan flop C 412. The output port, Q of the scan flop C 412 is provided to a fault site functional logic 428 and to the scan-input port, SI of scan flop E 420. The fault site functional logic 428 (represented as a cloud) also includes functional operators, and also includes a particular cell that is to be tested for a particular candidate fault/defect (e.g., an open wire) with the scan chain 432. The fault site functional logic 428 provides an output signal to the data input port, D of scan flop D 416.

The scan enable signal, SE provides a multiplexer (MUX) control signal for the scan flop A 404, the scan flop B 408, the scan flop C 412, scan flop D 416 and the scan flop E 420. In the examples illustrated, it is presumed that the scan enable signal, SE is an active high signal, but in other examples, the scan enable signal can be an active low signal. During time intervals that the scan enable signal, SE is asserted (e.g., logical 1), scan flop A 404, scan flop B 408, scan flop C 412, scan flop D 416 and scan flop E 420 are configured to pass a value received at the scan-input port, SI to the output port, Q. Conversely, during time intervals that the scan enable signal, SE is de-asserted (e.g., logical 0), scan flop A 404, B 408, scan flop C 412, scan flop D 416 and scan flop E 420 are configured to pass a value received at the data input port, D to the output port, Q.

The scan chain 432 is arranged to enable a scan shift path for test data, TEST DATA provided to the scan-input, SI of scan flop B 408. The scan chain 432 is arranged such that if the scan enable signal, SE is asserted (logical 1), the test data, TEST DATA propagates along the scan chain 432. Additionally, the scan chain 400 is configured such that the value input to the scan-input port, SI of scan flop E 420 is the same value that is applied to the fault site functional logic 428 from scan flop C 412. Accordingly, scan flop C 412 is upstream from the fault site functional logic 428. Furthermore, the IC design 400 is configured such that scan flop D 416 captures the output of the fault site functional logic 428. Therefore, scan flop D 416 is downstream from the fault site functional logic 428. Thus, a value read at the output, Q of scan flop D 416 is evaluated to determine whether the particular candidate fault/defect (e.g., an open wire) is present within the fault site functional logic 428 and the value read at the output, Q of scan flop E 420 is employable to confirm that the proper value was applied to the fault site functional logic 428 to test for the presence of the particular candidate fault/defect.

In the examples provided, it is presumed that the test data input, TEST DATA (implementing a test pattern) causes scan flop C 412 to provide a logical 0 at the output, Q during a given pulse of the clock signal, CLK that initializes the fault corresponding to the candidate fault/defect, and subsequently outputs a logical 1 after a next pulse of the clock signal, CLK to excite the fault corresponding to the candidate fault/defect. That is, the test data, TEST DATA causes the output, Q of scan flop C 412 to transition from a logical 0 to a logical 1 on subsequent pulses of the clock signal, CLK.

Figure 5:
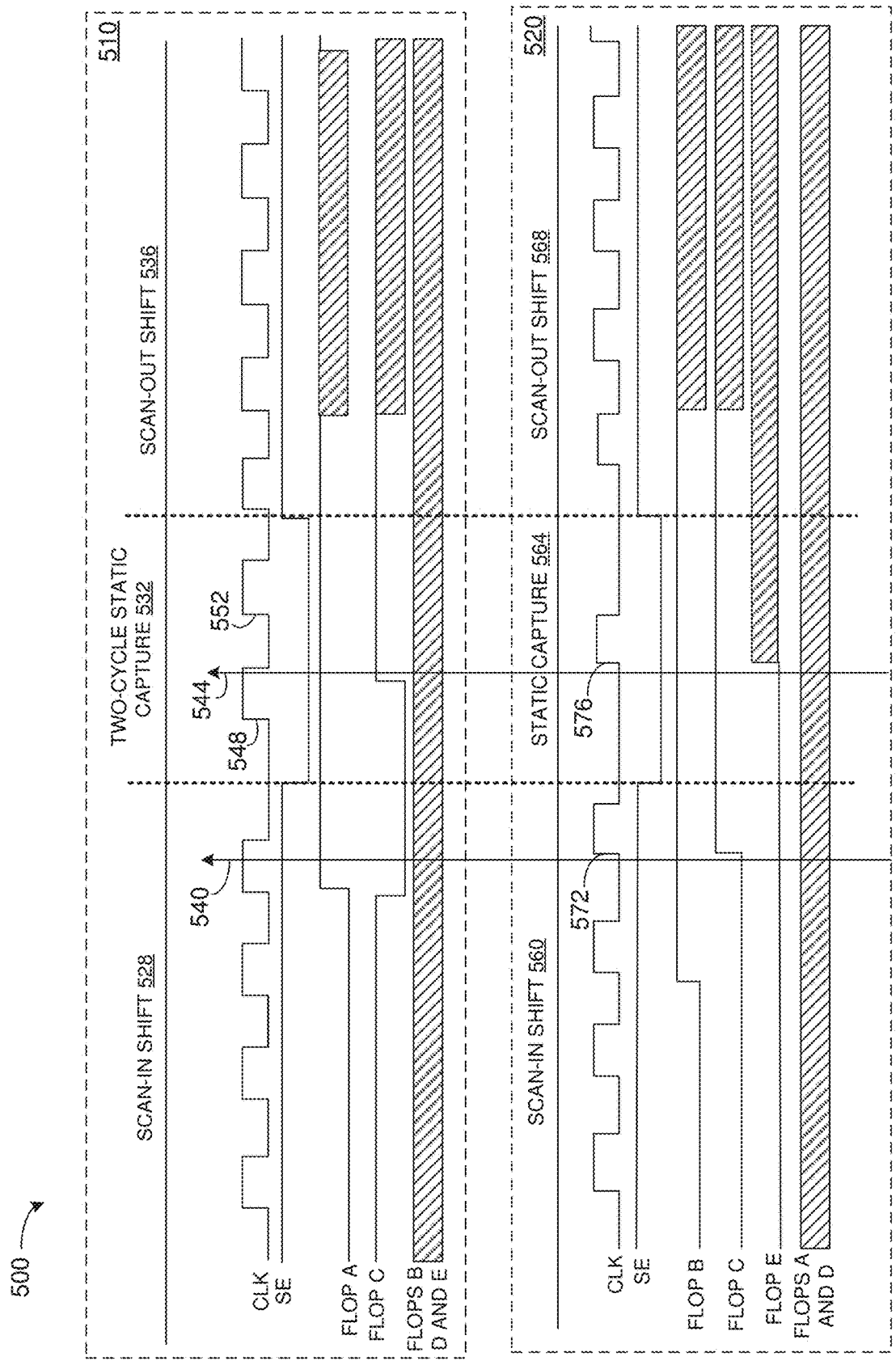
FIG. 5 illustrates a waveform diagram with a first set of waveforms and a second set of waveforms that represent waveforms of signals propagating through the scan chain of FIG. 4.

FIG. 5 illustrates a waveform diagram 500 with a first set of waveforms 510 and a second set of waveforms 520 that represent waveforms of signals propagating through the IC design 400 of FIG. 4. For purposes of illustration, the first set of waveforms 510 and the second set of waveforms 520 are plotted on the same time scale, and the same reference numbers are employed in FIGS. 4 and 5 to denote the same structure.

The first set of waveforms 510 of the waveform diagram 500 includes a scan-in shift interval 528, a two-cycle static capture interval 532 and a scan-out shift interval 536. In the first set of waveforms 510, the scan enable signal, SE is asserted (logical 1) during the scan-in shift interval 528 and the scan-out shift interval 536. The first set of waveforms 510 represent a conventional two-cycle (multicycle) test pattern that causes an output of scan flop C 412 to transition from a logical 0 to a logical 1 during the two-cycle static capture interval 532 that is generated to detect a candidate fault/defect in an IC chip. In the example illustrated, the candidate fault/defect is a multicycle cell-aware defect.

During the scan-in shift interval 528 the clock signal, CLK operates at a constant (or near constant) frequency, and the scan enable signal, SE is asserted (logical 1). During the scan-in shift interval 528 and the two-cycle static capture interval 532, the clock signal, CLK operates at a test frequency, which is usually at least one order of magnitude slower than a functional frequency of an IC chip that includes the scan chain 432. For example, if the functional frequency of the IC chip is 1 gigahertz (GHz), the test frequency of the scan chain 432 could be 100 megahertz (MHz) or less. During the scan-in shift interval 528, values of test data are loaded into the scan chain 432 and propagated through the scan chain 432.

For the first set of waveforms 510, during the scan-in shift interval 528, a fault initialization 540 occurs in response to a last rising edge of the clock signal, CLK prior to the two-cycle static capture interval 532. As illustrated, the first set of waveforms 510 and the second set of waveforms 520 are illustrated as having the same fault initialization 540 for purposes of comparison. The scan-in input, SI of scan flop A 404 (labeled "FLOP A" in FIG. 5) is loaded such that the output, Q of observable scan flop A transitions to a logical 1 in response to the fault initialization 540. Additionally, during the fault initialization 540, the output Q of observable scan flop C (labeled "FLOP C" in FIG. 5) transitions to a logical 0.

In the first set of waveforms 510, at a start of the two-cycle static capture interval 532, the scan enable signal, SE is de-asserted (e.g., logical 0), and the clock signal, CLK is inhibited from pulsing at regular intervals. Additionally, at the start of the two-cycle static capture interval 532, a fault simulator of the IC test engine (e.g., the fault simulator 190 of FIG. 1) is activated. In response to activation, the fault simulator verifies that a logical 0 is input to the fault site functional logic 428. As noted, the value input into the scan-in input, SI of scan flop E 420 is the same value that is input into the fault site functional logic 428 by scan flop C 412. Thus, during the two-cycle static capture interval 532, the fault simulator can monitor the value input into the scan-in input, SI of scan flop E 420 to verify that the fault site functional logic 428 is receiving the correct value for initializing and exciting the candidate fault/defect.

More particularly, the first set of waveforms 510 elicits the two-cycle static capture interval 532 which includes a first clock pulse 548 (a launch cycle) of the clock signal, CLK and a second clock pulse 552 of the clock signal, CLK (a capture cycle). The first clock pulse 548 (launch) and the second clock pulse 552 (capture) can have a frequency that is based on the test frequency for the IC design. Additionally, as illustrated, in response to the first capture pulse 548, the scan flop C transitions from a logical 0 to a logical 1. Hence, the launch cycle results in a fault excitation 544. Additionally, in response to the second clock pulse 552 (capture) scan flop D 416 captures the output of the functional site 428 to determine the effect (if any) on the candidate fault/defect. More particularly, as an example, if the output of the functional site 428 transitions from 0 to 1 due to the scan flop C 412 transitioning from 0 to 1, then the candidate fault/defect is observed by the scan flop D 416 since a defect free circuit would observe a 1 in the scan flop D 416, whereas the scan flop D 416 would observe a 0 in presence of the candidate fault/defect. Additionally, during execution of the test pattern on a fabricated IC chip (e.g., the fabricated IC chip 104 of FIG. 1) using an ATE (e.g., the ATE 198 of FIG. 1), if the value at the output, Q of the scan flop D 416 is an expected result, this expected result indicates that the candidate fault/defect is not present in the fabricated IC chip. Conversely, if the value at the output, Q of the scan flop D 416 is an unexpected result, this unexpected result indicates that the candidate fault/defect is possibly present in the fabricated IC chip. Similar to the fault initialization 540, the first set of waveforms 510 and the second set of waveforms 520 are illustrated as having the same time for fault excitation 544 for comparison purposes.

At the end of the two-cycle static capture interval 532, the scan enable signal is re-asserted (logical 1), and the fault simulator is disabled. Additionally, during the scan-out shift interval 536, the clock signal, CLK returns to providing pulses at the test frequency.

The second set of waveforms 520 represents a single cycle test pattern with sim-shifting applied such that the sim-shifted single cycle test pattern mimics the operation of the multicycle test pattern illustrated by the first set of waveforms 510. Accordingly, in the examples provided, it is presumed that a fault simulator (e.g., the fault simulator 190 of FIG. 1) fault simulated the single cycle test pattern and determined that sim-shifting the single cycle test pattern enables the single cycle test pattern to detect the same candidate fault/defect (e.g., a static multicycle cell-aware defect) that is detectable with the multicycle test pattern characterized by the first set of waveforms 510.

The second set of waveforms 520 of the waveform diagram 500 includes a scan-in shift interval 560, a static capture interval 564 and a scan-out shift interval 568. In the second set of waveforms 520, the scan enable signal, SE is asserted (logical 1) during the scan-in shift interval 528 and the scan-out shift interval 568. The second set of waveforms 520 represent a sim-shifted single cycle test pattern that causes an output of scan flop C 412 to transition from a logical 0 to a logical 1 during the fault initialization 540.

During the scan-in shift interval 560, the clock signal, CLK operates at a constant (or near constant) frequency, and the scan enable signal, SE is asserted (logical 1). During the scan-in shift interval 560, the static capture interval 564 and the scan-out shift interval 568, the clock signal, CLK operates at the test frequency. During the scan-in shift interval 560, values of test data are loaded into the IC design 400 and propagated through scan chains, such as the scan chain 432.

For the second set of waveforms 520, during the scan-in shift interval 528, the fault initialization 540 occurs prior to a last shift pulse 572 of the clock signal, CLK, which in turn is prior to the static capture interval 564. Moreover, the fault initialization 540 sets the output, Q of scan flop B 408 to a logical 1 and the output, Q of scan flop C 412 to a logical 0. Additionally, the pulse 572 of the clock signal, CLK causes the output, Q of scan flop C 412 to transition from the logical 0 to a logical 1 (a fault excitation value). This transition of scan flop C 412 corresponds to the transition that occurs during the two-cycle static capture interval 532 of the first set of waveforms 510. Additionally, in the second set of waveforms 520, at the fault initialization 540, the IC test engine activates the fault simulator, such that the window observed by the fault simulator moves relative to the test pattern characterized by the first set of waveforms 510. Accordingly, in the second set of waveforms 520, the fault simulator is activated during the scan-in shift interval 560, and while the scan enable signal, SE is asserted (e.g., logical 1). In response to activation, the fault simulator verifies the fault initialization value, namely that a logical 0 is input to the fault site functional logic 428.

In the second set of waveforms 520, at a start of the static capture interval 564, the scan enable signal, SE is de-asserted (e.g., logical 0), and the clock signal, CLK is inhibited from pulsing at regular intervals. As noted, the value input into the scan-in input, SI of scan flop E 420 is the same value that is input into the fault site functional logic 428 by scan flop C 412. Thus, during the scan-in shift interval 560 and during the static capture interval 564, the fault simulator can monitor the value input into the scan-in input, SI of scan flop E 420 to verify that the fault site functional logic 428 is receiving the correct value for initializing and exciting the candidate fault/defect. Accordingly, the second set of waveforms 520 fault simulates after a final shift register contents are in place (e.g., the output, Q of scan flop C 412 is a logical 1).

More particularly, the second set of waveforms 520 elicits the shift pulse 572 of the clock signal during the scan-in shift interval 560 which results in fault excitation and the capture pulse 576 of the clock signal during the capture interval 564 which observes the effect (if any) of the candidate fault/defect (e.g., a static multicycle cell-aware defect) in scan flop D 416. This operation, namely the reading of the output, Q of scan flop D 416 in response to the single capture pulse 576, corresponds to reading the output, Q of scan flop D 416 in response to the second clock pulse 552 (capture) in the first set of waveforms 510. Additionally, during execution of the test pattern on a fabricated IC chip (e.g., the fabricated IC chip 104 of FIG. 1) using an ATE (e.g., the ATE 198 of FIG. 1), if the value at the output, Q of scan flop D 416 is an expected result, this indicates that the candidate fault/defect is not present in the IC chip. Conversely, if the value at the output, Q of scan flop D 416 is an unexpected result, this unexpected result indicates that the candidate fault/defect is possibly present in the fabricated IC chip.

At the end of the static capture interval 564, the scan enable signal is re-asserted (logical 1), and the fault simulator is disabled. Additionally, during the scan-out shift interval 568, the clock signal, CLK returns to providing pulses at the test frequency. As compared to the first set of waveforms 510, in the second set of waveforms 520, the launch cycle, namely the fault excitation 544, occurs during the scan-in shift interval 560. More specifically, the launch cycle of the test pattern (corresponding to the pulse 572) for the second set of waveforms 520 is executed after the fault initialization 540 and before the start of the static capture interval 564. Accordingly, by leveraging operations in the scan-in shift interval 560 to execute the launch cycle of a test pattern, static multicycle faults/defects are detectable with a single cycle test pattern.

Moreover, in examples where a static fault/defect requires three or more clock cycles (N cycles), each of the clock cycles from 1 to cycle N−1 (launch cycle) can be executed during the scan-in shift interval 560. In these situations, the fault simulator is activated during N−1 shift cycles prior to the capture pulse 576. The fault initialization 540 occurs prior to the N−1 shift cycles from the capture pulse 576. For example, for a static fault/defect requiring 3 clock cycles, the fault simulator is activated during the second to last shift cycle of the scan-in shift interval 560 and the values prior to the second to last shift cycle provide the fault initialization 540 state.

Referring back to FIG. 1, the first set of test patterns, which are implemented as single cycle test patterns are employable to test for both single cycle faults/defects (boundary model and cell-aware defects) and to test for static multicycle cell-aware defects. Accordingly the IC test engine 150 can examine each cell instance 136 to determine which, if any, test patterns and/or candidate faults/defects should be filtered (removed or not generated) based on sim-shifted test patterns generated for testing candidate faults/defects of the IC design 108.

As an example of sim-shifting a single cycle test pattern of the first set of test patterns to test for a multicycle fault/defect, consider the DDM 300 of FIG. 3 in the given example. In the given example, the test pattern, p1: 01:11, (Out) 01 is employable to detect static faults for candidate faults/defects (each represented as one of the 41 columns) with a value of 1. Thus, in a situation where sim-shifting the single cycle test pattern causes test pattern p1 to be executed, this single cycle test pattern (through sim-shifting) enables the testing for the candidate fault/defect characterized in column 1 of the DDM 300. Additionally, the sim-shifting of the single cycle test pattern also enables detection of other static multicycle faults/defects caused by other candidate faults/defects with a value of 1 in the DDM 300, such as the candidate faults/defects corresponding to columns 3, 5, 7-11, 13, 19, 21, 23, 33, 35 and 38. In such a situation, the IC test engine 150 of FIG. 1 can mark-off these other static multicycle cell-aware defects, and the test patterns for the other static multicycle faults/defects can be filtered (removed or not generated) for testing to avoid redundant testing.

Additionally, the IC test engine 150 can examine the untested defects in the IC design and generate a second set of test patterns, which can be referred to as top-off single cycle cell-aware test patterns. The second set of test patterns are single cycle cell-aware test patterns that target particular static single cycle cell-aware defects in the IC design 108. Additionally, the fault simulator 190 can fault simulate each single cycle test pattern in the second set of test patterns against other single cycle static cell-aware with serendipitous fault detection, and these other single cycle static faults/defects can be marked-off. Further, the fault simulator 190 can apply sim-shifting to each test pattern in the second set of test patterns to fault simulate each such test pattern against other static multicycle test patterns that are not marked-off (e.g., in a manner described with respect to FIG. 5). Accordingly, in situations where sim-shifting single cycle test patterns of the second set of test patterns enables the detection of untested static multicycle cell-aware defects, these faults/defects can also be marked-off. Accordingly, test patterns for the other static single cycle cell-aware defects and the other static multicycle cell-aware defects can be filtered (removed or not generated) for testing to avoid redundant testing.

Additionally, the IC test engine 150 can again examine the untested faults/defects in the IC design and generate a third set of test patterns, which can be referred to as top-off multicycle cell-aware test patterns. The top-off multicycle cell aware test patterns target multicycle static faults/defects that are not yet marked off.

In other examples, the IC test engine 150 can generate static single cycle cell-aware test patterns as the first set of test patterns. In such examples, the first set of test patterns are single cycle cell-aware test patterns that target particular static single cycle cell-aware defects in the IC design 108. Additionally, the fault simulator 190 can apply sim-shifting to each test pattern in the first set of test patterns to fault simulate each such test pattern against static multicycle cell-aware defects (e.g., in a manner described with respect to FIG. 5). Accordingly, in situations where sim-shifting single cycle test patterns of the first set of test patterns enables the detection of static multicycle cell-aware defects, these detectable static multicycle faults/defects can be marked-off.

Additionally, continuing with these examples (the first set of test patterns are static single cycle cell-aware test patterns), the IC test engine 150 can examine the untested faults/defects in the IC design 108 and generate a second set of test patterns, which can be referred to as top-off single cycle cell-aware test patterns. The second set of test patterns are single cycle cell-aware test patterns that target particular static multicycle cell-aware defects utilizing sim-shifting, and these targeted static multicycle cell-aware defects can be marked-off. Accordingly, in situations where sim-shifting single cycle test patterns of the second set of test patterns enables the detection of untested static multicycle cell-aware defects, these faults/defects can be marked-off. Accordingly, test patterns for the other static single cycle cell-aware defects and the other static multicycle cell-aware defects can be filtered (removed or not generated) for testing to avoid redundant testing.

Additionally continuing with these examples (the first set of test patterns are static single cycle cell-aware test patterns), the IC test engine 150 can again examine the untested faults/defects in the IC design and generate a third set of test patterns, which can be referred to as top-off multicycle cell-aware test patterns. The top-off multicycle cell aware test patterns target multicycle static faults/defects that are not yet marked off.

In any such example, after selecting the first set of test patterns, the second set of test patterns and the third set of test patterns, the IC engine 150 can provide test patterns 196 that can be a combination of the first set of test patterns, the second set of test patterns and the third set of test patterns that are employable for testing the fabricated IC chip 104. The IC test engine 150 can output the test patterns 196, which include one or more sim-shifted test patterns. The test patterns 196 are employable by an ATE 198 to test the fabricated IC chip 104. In some examples, the test patterns 196 are stored in the memory 116 and/or the ATE 198 prior to execution of the testing. The ATE 198 can alternatively be referred to as an IC chip tester or an IC chip tester machine. The ATE 198 can be implemented as a hardware device that is electrically coupled to pins on the fabricated IC chip 104. In the examples illustrated, such pins can be coupled to the interface 140 of the fabricated IC chip 104.

The test patterns 196 employed by the ATE 198 contain stimuli to be applied to inputs and the expected values on the outputs of the fabricated IC chip 104. The ATE 198 is configured such that if the measured value by the ATE 198 is different from the expected value specified in the test patterns 196, the ATE 198 stores the failure data. The failure data can be sent to the IC test engine 150 later to determine the cause of one or more failures in the fabricated IC chip 104. In situations where application of the test patterns 196 indicates that the fabricated IC chip 104 is operating properly (e.g., within acceptable tolerances), the fabricated IC chip 104 can be approved for deployment. In situations where the application of the test patterns 196 indicate that the fabricated IC chip 104 is not operating properly (e.g., within tolerances), the fabricated IC chip 104 can be rejected, such that the fabricated IC chip is not deployed.

The IC design 108 has a variety of cell types 134 based on the architecture of the IC design 108 and the specific operation environment in which the fabricated IC chip 104 is designed to operate. The test patterns 196 generated by the IC test engine 150 are tuned based on the fault rules files 158, wherein some of the test patterns generated are executed as sim-shifted single cycle test patterns that are employable to detect both single cycle faults/defects and multicycle faults/defects. The fault rules files 158 are unique for each cell type 134 and describe the defect initialization and excitation values on the input pins and expected output pin values of the given cell type 134. By employing the ATPG techniques to provide sim-shifting of some test patterns within the test patterns 196, the quality and quantity of test patterns 196 is improved (relative to conventional ATPG techniques). Accordingly, the number of detectable faults/defects in the fabricated IC chip 104 is improved, such that the overall accuracy of the testing executed by the ATE 198 is improved as well.

Figure 6:
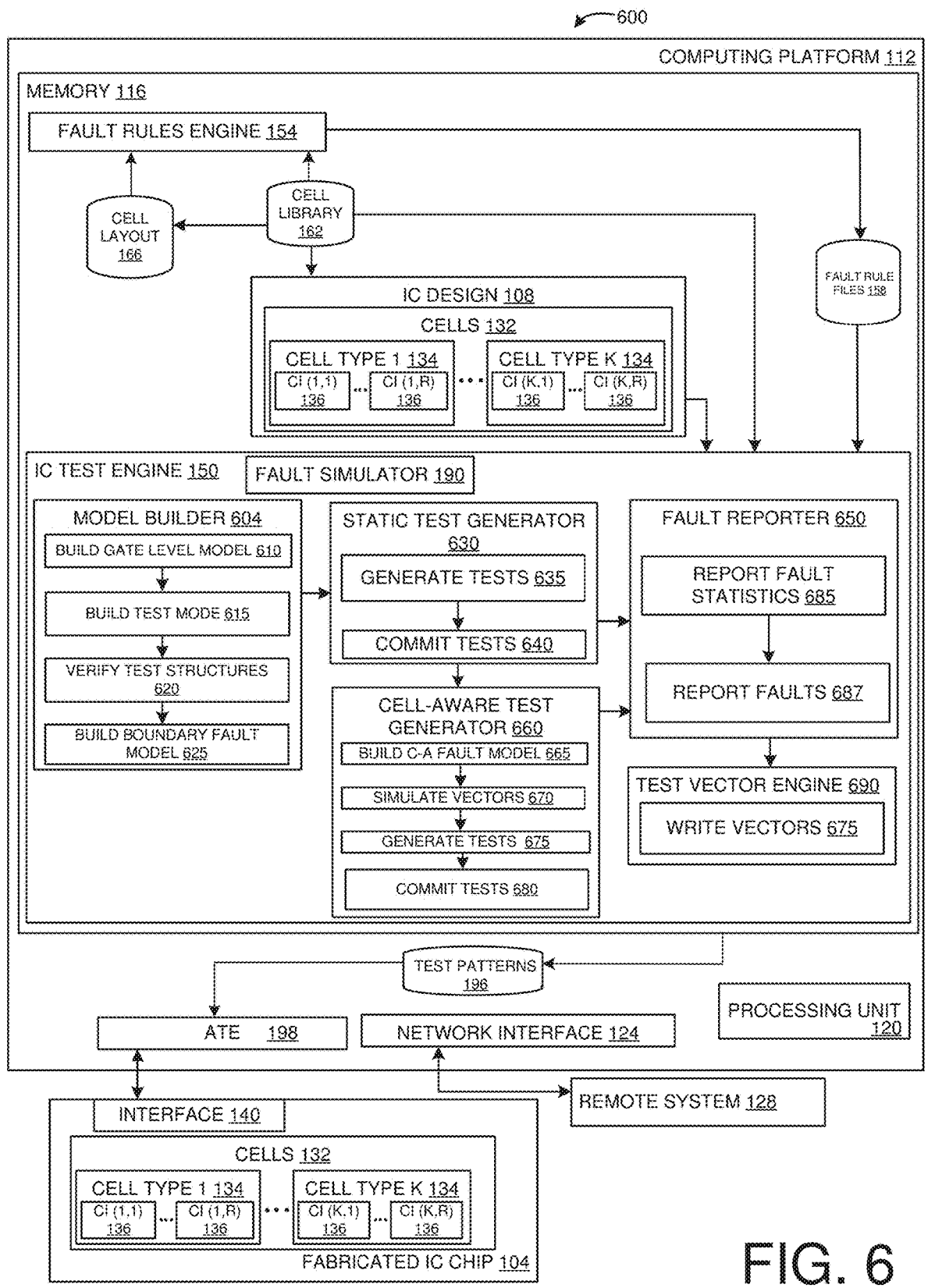
FIG. 6 illustrates another example of a system for testing a fabricated IC chip that is based on an IC design.

FIG. 6 illustrates a system 600 for testing the fabricated IC chip 104. The system 600 is similar to the system 100 of FIG. 1 with a detailed view and description of the IC test engine 150. Thus, for purposes of simplification of explanation, the same reference numbers are employed in FIGS. 1 and 6 to denote the same structure. Additionally, some reference numbers are not re-introduced. The IC design 108 can be stored in the memory 116 of the computing platform 112. The IC design 108 can be implemented, for example, as design specifications for an IC chip. The fabricated IC chip 104 represents a physical instantiation of the IC design 108, and the interface 140 can provide an interface for external systems to provide stimuli to the components of the fabricated IC chip, including the cells 132 of the fabricated IC chip 104.

The IC test engine 150 stored in the memory 116 is configured to employ ATPG techniques to generate the test patterns 196 that include single cycle test patterns that are employed to detect both single cycle faults/defects and multicycle faults/defects in the IC chip 104 to ensure proper operation. More specifically, the test patterns 196 include at least one single cycle test pattern that is generated to test for a static single cycle fault/defect (a boundary model defect or a cell-aware defect) in the fabricated IC chip 104, but is also employed (through sim-shifting of the single cycle test pattern) to test for a multicycle fault/defect (or multiple multicycle faults/defects). More particularly, the IC test engine 150 generates the test patterns 196 that are employable by the ATE 198 to test the fabricated IC chip 104. The ATE 198 is configured such that if the measured value by the ATE 198 is different from the expected value specified in the test patterns 196, the ATE 198 stores the failure data. The failure data can be sent to the IC test engine 150 later to determine the cause of one or more failures in the fabricated IC chip 104

The IC test engine 150 can also operate in concert with the fault rules engine 154 stored in the memory 116. The fault rules engine 154 can be configured/programmed to generate fault rules files 158. In some examples, the fault rules engine 154 generates DDMs that each represent a user-readable format of a corresponding fault rules file 158. Each fault rules file 158 represents a set of fault rules for a particular cell type 134 that corresponds to a cell that is selected from a cell library 162. The cell library 162 can include, but is not limited to, data characterizing a physical layout of each of the K number of cell types 134 in the cells 132 of the IC design 108 and the fabricated IC chip 104. The cell library 162 can also include structural Verilog (.v), behavioral Verilog (.v) and timing models (.lib).

To generate the fault rules files 158, the fault rules engine 154 can read a cell layout 166 from the cell library 162. The cell layout 166 can characterize a physical layout for a particular cell type 134 extracted from the cell library 162. The fault rules engine 154 generates a particular fault rules file 158 of the fault rules files 158 based on the cell identified in the cell layout 166. Each fault rules file 158 can provide information similar to the information included in the DDM 300 described with respect to the given example.

The fault rules files 158 for each of the K number of cell types 134 of the cells 132 included in the IC design 108 are provided to the IC test engine 150 for the generation of cell-aware both single cycle and multicycle test patterns for the fabricated IC chip 104 using ATPG techniques. Moreover, the IC test engine 150 can generate both cell-aware and non-cell aware test patterns (e.g., boundary model static test patterns).

The IC test engine 150 can represent a plurality of software modules operating in an ordered sequence to generate the test patterns 196 using ATPG techniques. The test patterns include a set of single cycle test patterns that are each generated for detecting a particular static single cycle fault/defect. Additionally, at least one such single cycle test pattern is employed to detect a multicycle fault/defect (or multiple multicycle faults/defects) through sim-shifting. The IC test engine 150 includes a model builder 604 that can build a model of the IC design 108 that is employable to generate test patterns to test the fabricated IC chip 104. To build the model of the IC design 108, the model builder 604 can execute model builder operations. More particularly, at 610, the model builder 604 builds a gate model of the IC design 108. At 615, the model builder 604 builds a test mode. The build test mode reads test pin specifications and creates a test mode view given these test pin specifications. Such test pin specifications, among other things, can include scan-input pin names, scan-output pin names, test clock pin names, set/reset pin names and other constraints necessary to put the design in a test mode.

At 620, the model builder 604 verifies the presence of test structures in the gate level model of the IC design 108. The test structures represent scan and test circuitry present in the IC design 108 to facilitate the application of cell-aware test patterns to the fabricated IC chip 104. The operations at 620 also check if the IC design 108 complies with test design rules given the test constraints/specifications read in 615. For example, the operations at 620 can verify that the flops in the IC design 108 can be controlled by specified test clocks, and can verify that these test clocks can be controlled properly through primary input pins. Additionally, the operations at 620 can verify that set/reset to flops be controlled through primary input pins or if the flops are in an off state.

At 625, the model builder 604 can employ the gate level design to build a boundary fault model for the IC design 108. The boundary fault model includes candidate faults/defects represented as stuck-at 1 or 0. The boundary fault model built by the model builder 604 can be provided to a static test generator 630 of the IC test engine 150.

The static test generator 630 can execute test generation operations for static test patterns, including single cycle test patterns and multicycle test patterns. More particularly, at 635, the static test generator 630 can employ ATPG techniques to generate single cycle boundary model test patterns for the fabricated IC chip 104 based on the boundary fault model generated by the model builder 604. More specifically, the IC test engine 150 can generate a set of test patterns tailored for each of the R number of cell instances 136 of each of the K number of cell types 134 of the cells 132 in the IC design 108. The single cycle test patterns are generated to target candidate faults/defects at a boundary of cells 132 of the IC design 108.

At 640 the static test generator 630 commits the test patterns generated at 635 to test the fabricated IC chip 104. The test patterns generated by the static test generator 630 can be provided to a fault reporter 650 and to a cell-aware test generator 660.

The cell-aware test generator 660 is configured to generate cell-aware test patterns for the IC design 108. At 665, the cell-aware test generator 660 can employ the fault rules files 158 and the gate level design (generated by the model builder 604) to build a cell-aware fault model for the IC design 108. In certain implementations, the build boundary fault model 625 and the build cell-aware fault model 665 could be combined as a single operation. The cell-aware fault model includes candidate faults/defects represented as shorts or opens identified by the fault rules engine 154. At 670, the cell-aware test generator 660 employs the fault simulator 190 to fault simulate the single cycle boundary model test patterns generated by the static test generator 630 against static single cycle cell-aware defects and multicycle cell-aware defects. More particularly, as explained with respect to FIG. 5, through sim-shifting, a single cycle test pattern is employable to detect a multicycle fault/defect. Moreover, at 670, the static single cycle and multicycle cell-aware defects that are detectable with the single cycle boundary model test patterns are marked-off by simulate vectors.

At 675, the cell-aware test generator 660 can execute test generation operations. More particularly, at 675, the cell-aware test generator 660 can employ ATPG techniques to generate single cycle and multicycle cell-aware test patterns for the fabricated IC chip 104 based on the cell-aware fault model. More specifically, the IC test engine 150 can examine the fault rules files 158 and the untested static faults/defects to generate a set of top-off single cycle test patterns that target single cycle cell-aware defects and that can detect multicycle faults/defects with sim-shifting (as explained with respect to FIG. 5). The single cycle and multicycle cell-aware defects can be marked-off by the cell-aware test generator 660. Additionally, at 675, the cell-aware test generator 660 can generate a set of top-off multicycle test patterns that target untested static multicycle cell-aware defects in the fabricated IC chip 104.

At 680 the cell-aware test generator 660 commits the test patterns generated at 635 to test the fabricated IC chip 104. The test patterns generated by the static test generator 630 can be provided to a fault reporter 650.

The fault reporter 650 that can execute operations related to fault reporting. More particularly, at 685, the fault reporter 650 can generate report fault statistics that characterize, for example data related to the cell-aware test patterns applied to the fabricated IC chip 104. Additionally, at 687, the fault reporter 650 can generate fault reports for the fault statistics and cell defect statistics.

A test vector engine 690 of the IC test engine 150 can aggregate and convert the test patterns generated by the static test generator 630 and the cell-aware test generator 660 into a format consumable by the ATE 198 or other tools/machines such as simulation. In particular, at 695, the test vector engine 690 can write vectors that implement the test patterns 196 that are employable by the ATE 198 or the other tools/machines. The test patterns 196 can be stored, for example, on the memory 116 and/or at the ATE 198.

The ATE 198 stimulates inputs of the fabricated IC chip 104 as dictated by the test patterns 196 and the ATE 198 is configured to compare a measured output of the fabricated IC chip 104 with expected values stored in the test patterns 196. In case of mismatch, a failure log is generated by the ATE 198. At a subsequent time, this failure log can be converted into a format readable by the IC test engine 150 to analyze the cause of failures at the fabricated IC chip 104.

The boundary model test patterns generated by the static test generator 630 and the cell-aware test patterns generated by the cell-aware test generator 660 that, in combination, form the test patterns 196 vary considerably based on the architecture of the IC design 108 by the fabricated IC chip 104 and the specific environment in which the fabricated IC chip 104 is designed to operate. By applying sim-shifting to certain single cycle test patterns, these single cycle test patterns are employable to test for static multicycle faults/ defects that would conventionally need a multicycle test pattern for detection, thereby improving the quality of the test patterns 196 by increasing the faults detected by application of the test patterns 196. Additionally, in this manner, the overall time needed for the ATE 198 to test the fabricated IC chip 104 can be reduced.

Figure 7:
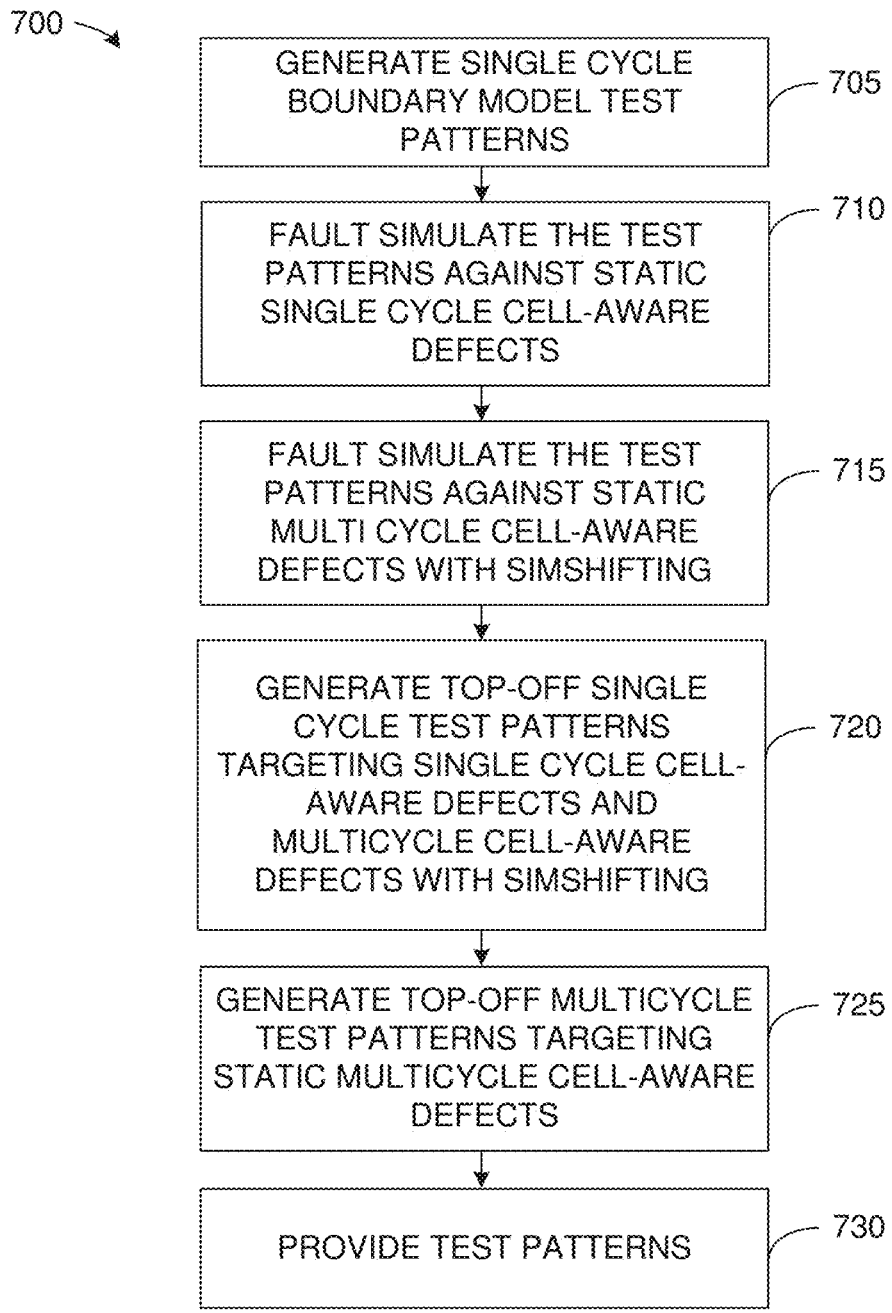
FIG. 7 illustrates a flowchart of an example method for generating test patterns for a fabricated IC chip.
Figure 8:
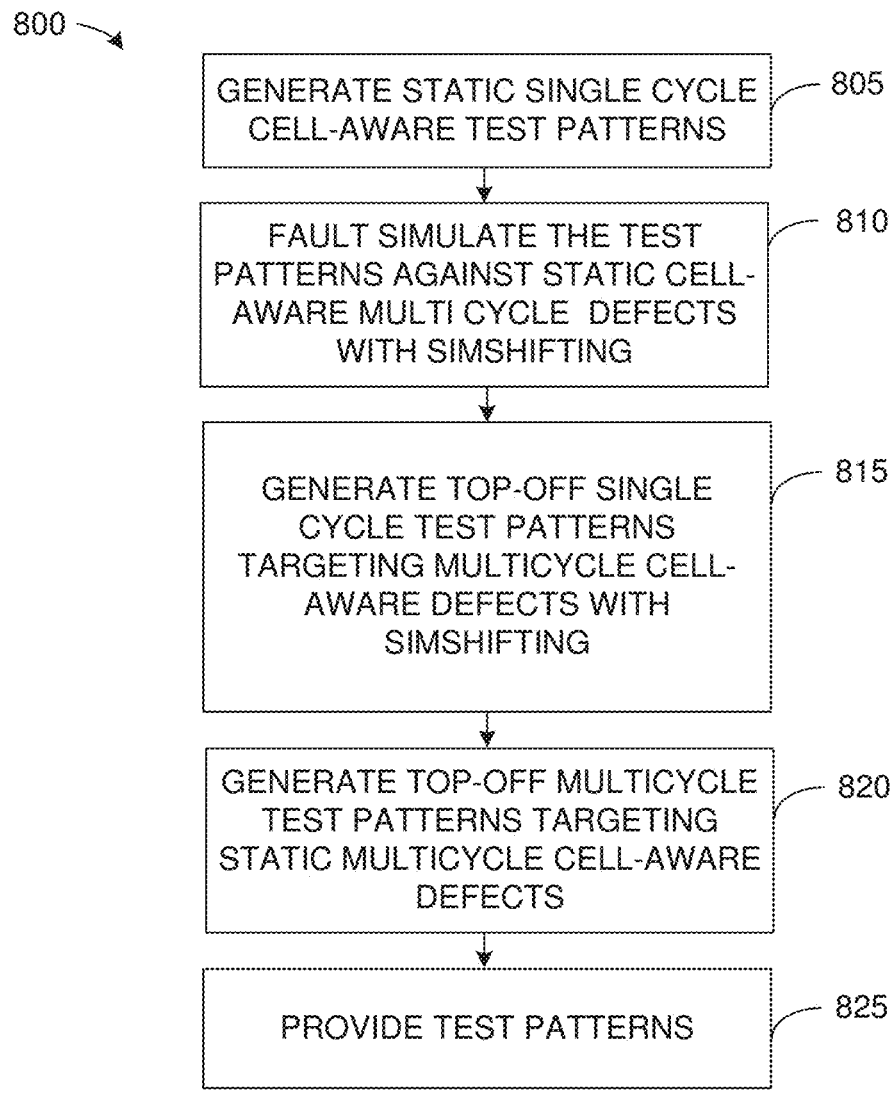
FIG. 8 illustrates a flowchart of another example method for generating test patterns for a fabricated IC chip.

In view of the foregoing structural and functional features described above, example methods will be better appreciated with reference to FIGS. 7 and 8. While, for purposes of simplicity of explanation, the example methods of FIGS. 7 and 8 are shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method.

FIG. 7 illustrates a flowchart of an example method 700 for generating test patterns for testing a fabricated IC chip, such as the fabricated IC chip 104 of FIG. 1 that is based on an IC design, such as the IC design 108 of FIG. 1. The method 700 can be executed, for example by an IC test engine, such as the IC test engine 150 of FIG. 1. At 705, the IC test engine can generate a first set of test patterns using ATPG techniques. The first test patterns can include single cycle boundary model test patterns. Each single cycle test pattern of the first set of test patterns can target a particular static single cycle fault/defect in the fabricated IC chip 104.

At 710, the IC test engine employs a fault simulator (e.g., the fault simulator 190 of FIGS. 1 and 6) to fault simulate the first set of test patterns against other static single cycle cell-aware defects in the IC design. The IC test engine can mark-off the single cycle cell-aware defects that are detectable by the first set of test patterns, which are single cycle boundary model test patterns targeting static boundary model single cycle defects. At 715, the IC test engine can employ the fault simulator to fault simulate the first set of test patterns against static multicycle cell-aware defects through sim-shifting (e.g., as explained with respect to FIG. 5). The static multicycle cell-aware defects that are detectable with the first set of test patterns, which are single cycle boundary model test patterns targeting static boundary model single cycle defects, are marked-off. Marking-off the static single cycle cell-aware defects (at 710) and the static multicycle cell-aware defects (at 715) avoids unneeded generation of test patterns specifically targeting these marked-off static single cycle cell-aware defects and static multicycle cell-aware defects.

At 720, the IC test engine can generate a second set of test patterns using ATPG techniques. The second set of test patterns are top-off test patterns that target untested single cycle cell-aware defects. Additionally, at 720, the IC test engine can employ the fault simulator to fault simulate the second set of test patterns against untested static multicycle cell-aware defects through sim-shifting (e.g., explained with respect to FIG. 5). At 725, the IC test engine can generate a third set of test patterns using ATPG techniques. The third set of test patterns can be multicycle test patterns that target untested static cell-aware multicycle patterns.

At 730, the IC test engine can aggregate the first set of test patterns, the second set of test patterns and the third set of test patterns to provide test patterns (e.g., the test patterns 196 of FIG. 1) to an ATE 198 that can apply the test patterns to the fabricated IC chip 104. By employing the method 700, the number of detectable defects by a given set of test patterns in the fabricated IC chip is increased thereby reducing ATE 198 test time and increasing defect detection quality.

FIG. 8 illustrates a flowchart of another example method 800 for generating test patterns for testing a fabricated IC chip, such as the fabricated IC chip 104 of FIG. 1 that is based on an IC design, such as the IC design 108 of FIG. 1. The method 800 can be executed, for example by an IC test engine, such as the IC test engine 150 of FIG. 1. At 805, the IC test engine can generate a first set of test patterns using ATPG techniques. The first test patterns can include single cycle cell-aware test patterns. Each single cycle test pattern of the first set of test patterns can target a particular static cell-aware single cycle defect in the fabricated IC chip 104.

At 810, the IC test engine can cause a fault simulator (e.g., the fault simulator 190 of FIG. 1) to fault simulate the first set of test patterns against static multicycle cell-aware defects with sim-shifting (e.g., as described with respect to FIG. 5). The static multicycle cell-aware defects that are detectable by the first set of test patterns, which are static single cycle test patterns targeting static cell-aware single cycle defects, are marked-off by the IC test engine.

At 815, the IC test engine can generate a second set of test patterns. The second set of test patterns are top-off test single cycle patterns that target untested multicycle cell-aware defects with sim-shifting. Accordingly, at 815, the IC test engine can fault simulate the second set of test patterns against untested static multicycle cell-aware defects through sim-shifting (e.g., explained with respect to FIG. 5). At 820, the IC test engine can generate a third set of test patterns using ATPG techniques. The third set of test patterns can be multicycle test patterns that target untested static cell-aware multicycle patterns.

At 825, the IC test engine can aggregate the first set of test patterns, the second set of test patterns and the third set of test patterns to provide test patterns (e.g., the test patterns 196 of FIG. 1) to an ATE 198 that can apply the test patterns to the fabricated IC chip 104. By employing the method 800, the number of detectable defects in the fabricated IC chip is increased.

Figure 9:
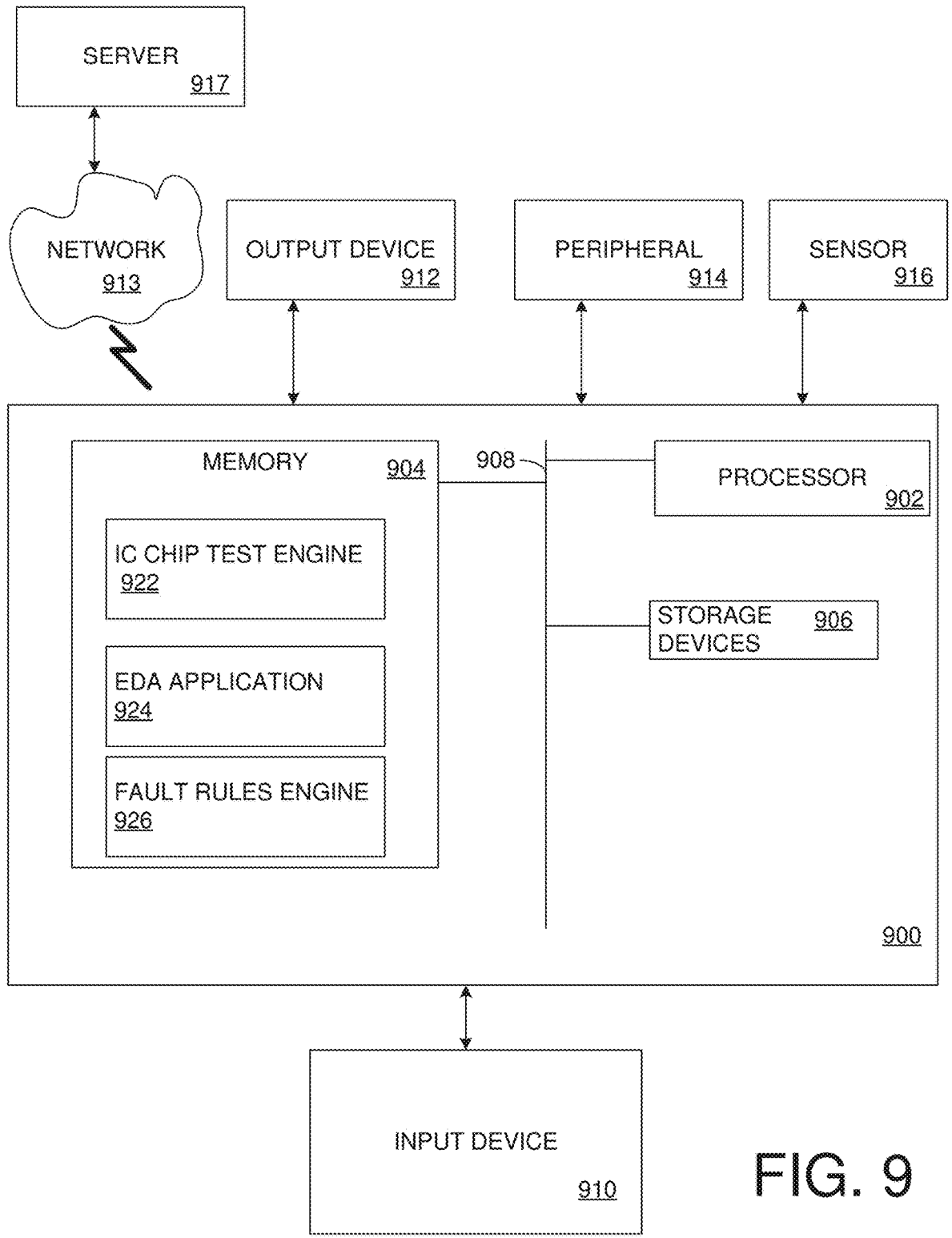
FIG. 9 illustrates an example of a computing system employable to execute an IC test engine and a fault rules engine.

The examples herein may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory and input and output device(s) to perform one or more embodiments. As shown in FIG. 9, the computing system 900 can include a computer processor 902, associated memory 904 (e.g., RAM), cache memory, flash memory, etc.), one or more storage devices 906 (e.g., a solid state drive, a hard disk drive, an optical drive such as a compact disk (CD) drive or digital versatile disk (DVD) drive, a flash memory stick, etc.) and numerous other elements and functionalities. The computer processor 902 may be an IC chip for processing instructions. For example, the computer processor may be one or more cores, or micro-cores of a processor. Components of the computing system 900 can communicate over a data bus 908.

The computing system 900 may also include an input device 910, such as any combination of one or more of a touchscreen, keyboard, mouse, microphone, touchpad, electronic pen, or any other input device. Further, the computing system 900 can include an output device 912, such as one or more of a screen (e.g., light emitting diode (LED) display, an organic light emitting diode (OLED) display, a liquid crystal display (LCD), a plasma display, touchscreen, cathode ray tube (CRT) monitor, projector, or other display device), a printer, external storage, or any other output device. In some examples, such as a touch screen, the output device 912 can be the same physical device as the input device 910. In other examples, the output device 912 and the input device 910 can be implemented as separate physical devices. The computing system 900 can be connected to a network 913 (e.g., LAN, a wide area network (WAN) such as the Internet, a mobile network, or any other type of network) via a network interface connection (not shown). The input device 910 and output device(s) 912 can be connected locally and/or remotely (e.g., via the network 913) to the computer processor 902, the memory 904 and/or the storage devices 906. Many different types of computing systems exist, and the aforementioned input device 910 and the output device 912 can take other forms. The computing system 900 can further include a peripheral 914 and a sensor 916 for interacting with the environment of the computing system 900 in a manner described herein.

Software instructions in the form of computer readable program code to perform embodiments disclosed herein can be stored, in whole or in part, temporarily or permanently, on a non-transitory computer readable medium such as a CD, DVD, storage device, a diskette, a tape, flash memory, physical memory, or any other computer readable storage medium. Specifically, the software instructions can correspond to computer readable program code that when executed by a processor, is configured to perform operations disclosed herein. The computing system 900 can communicate with a server 917 via the network 913.

The memory 904 can include an IC test engine 922 to test an IC design that is instantiated as a fabricated IC chip. The IC design can be generated, for example, by an EDA application 924. The memory 904 can also include a fault rules engine 926 for generating fault rules files and/or DDMs to facilitate the testing of the fabricated IC chip.

Further, one or more elements of the aforementioned computing system 900 can be located at a remote location and connected to the other elements over the network 913. Additionally, some examples can be implemented on a distributed system having a plurality of nodes, where each portion of an embodiment can be located on a different node within the distributed system. In one example, the node corresponds to a distinct computing device. Alternatively, the node can correspond to a computer processor with associated physical memory. The node can alternatively correspond to a computer processor or micro-core of a computer processor with shared memory and/or resources.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications and variations that fall within the scope of this application, including the appended claims. As used herein, the term "includes" means includes but not limited to, the term "including" means including but not limited to. The term "based on" means based at least in part on". Additionally, where the disclosure or claims recite "a," "an," "a first," or "another" element, or the equivalent thereof, it should be interpreted to include one or more than one such element, neither requiring nor excluding two or more such elements.

What is claimed is:

1. A non-transitory machine-readable medium having machine-readable instructions comprising an integrated circuit (IC) test engine, the machine-readable instructions for the IC test engine being executable by a processing unit with one or more processor cores to perform operations comprising:
   generating a plurality of single cycle test patterns that target a plurality of static single cycle faults and/or defects of a fabricated IC chip based on an IC design; and
   fault simulating the plurality of single cycle test patterns against a plurality of multicycle faults and/or defects in the IC design, wherein a given single cycle test pattern of the plurality of single cycle test patterns is sim-shifted to enable detection of a given multicycle fault and/or defect of the plurality of multicycle faults and/or defects.

2. The medium of claim 1, wherein at least one shift clock pulse prior to a capture interval of the given single cycle test pattern is fault simulated as a launch cycle and a capture clock pulse is fault simulated as a capture cycle.

3. The medium of claim 2, wherein the launch cycle of the given single cycle test pattern causes an output of a first observable scan flop of the IC design that is upstream of the given multicycle fault and/or defect to transition from a first value to a second value, and the capture clock pulse of the given single cycle test pattern reads a value output from a second observable scan flop of the IC design, wherein the second observable scan flop is downstream from the given multicycle fault and/or defect.

4. The medium of claim 3, wherein fault simulating of the given single cycle test pattern includes assertion of a scan enable signal during a scan-in shift interval of the given single cycle test pattern and de-assertion of the scan enable signal during a static capture interval of the given single cycle test pattern that includes the capture cycle.

5. The medium of claim 4, wherein the IC test engine re-asserts the scan enable signal at an end of the static capture interval.

6. The medium of claim 1, wherein the given multicycle fault and/or defect detectable by the given single cycle test pattern is an open wire fault.

7. The medium of claim 1, wherein the plurality of static single cycle faults and/or defects are a plurality of single cycle boundary model defects, and the IC test engine further fault simulates the plurality of single cycle test patterns against a plurality of static single cycle and a plurality of multicycle cell-aware defects of the fabricated IC chip, wherein the given single cycle test pattern of the plurality of single cycle test patterns enables detection of a given static single cycle cell-aware defect of the plurality of static single cycle cell-aware defects and a given static multicycle cell-aware defect of the plurality of static multicycle cell-aware defects.

8. The medium of claim 7, wherein the IC test engine marks-off the given static cell-aware single cycle defect and the given multicycle cell-aware defects from further test pattern generation.

9. The medium of claim 8, wherein:
   the IC test engine generates a plurality of top-off single cycle test patterns that target untested static single cycle cell-aware defects in the IC design;
   the IC test engine fault simulates the plurality of top-off single cycle test patterns against a plurality of untested multicycle defects; and
   a given top-off single cycle test pattern of the plurality of top-off single cycle test patterns enables detection of another multicycle fault and/or defect of the plurality of untested multicycle defects.

10. The medium of claim 1, wherein the plurality of static single cycle defects are a plurality of single cycle cell-aware defects, and the IC test engine marks-off the given multicycle fault and/or defect from further test pattern generation.

11. The medium of claim 10, wherein the IC test engine generates a plurality of top-off single cycle test patterns that target untested multicycle cell-aware defects in the IC design.

12. The medium of claim 1, wherein the plurality of multicycle defects of the IC design are based on a plurality of fault rules files for the IC design, wherein each of the plurality of fault rules files is associated with a respective cell type of a plurality of cell types in the IC design.

13. A system comprising:
   a non-transitory memory that stores machine-readable instructions; and
   a processing unit that accesses the memory and executes the machine-readable instructions, the machine-readable instructions comprising:
      an integrated circuit (IC) test engine causing the processing unit to perform operations comprising:
         generating a plurality of single cycle test patterns that target a plurality of static single cycle defects of a fabricated IC chip based on an IC design; and
         fault simulating the plurality of single cycle test patterns against a plurality of multicycle defects in the IC design that are based on a plurality of fault rules files for the IC design, wherein each of the plurality of fault rules files is associated with a respective cell type of a plurality of cell types in the IC design, and a given single cycle test pattern of the plurality of single cycle test patterns is sim-shifted to enable detection of a given multicycle fault and/or defect of the plurality of multicycle defects.

14. The system of claim 13, wherein at least one shift clock pulse prior to a capture interval of the given single cycle test pattern is fault simulated as a launch cycle and a capture clock pulse of the given single cycle test pattern is fault simulated as a capture cycle, and the launch cycle of the given single cycle test pattern causes an output of a first observable scan flop of the IC design that is upstream of the given multicycle fault and/or defect to transition from a first value to a second value, and the capture cycle of the given single cycle test pattern reads a value output from a second observable scan flop of the IC design, wherein the second observable scan flop is downstream from the given multicycle fault and/or defect.

15. The system of claim 13, wherein the given multicycle fault and/or defect detectable by the given single cycle test pattern is an open wire fault.

16. The system of claim 13, wherein the plurality of static single cycle faults and/or defects are a plurality of single cycle boundary model faults, and the IC test engine further fault simulates the plurality of single cycle test patterns against a plurality of static single cycle cell-aware and multicycle cell-aware defects of the fabricated IC chip, wherein the given single cycle test pattern of the plurality of single cycle test patterns enables detection of a given static single cycle cell-aware defect of the plurality of static single cycle cell-aware defects and a given static multicycle cell-aware defect of the plurality of static multicycle cell-aware defects.

17. The system of claim 13, wherein:
   the plurality of static single cycle defects is a plurality of single cycle cell-aware defects, and the IC test engine marks-off the given multicycle fault and/or defect from further test pattern generation; and
   the IC test engine generates a plurality of top-off single cycle test patterns that target untested multicycle cell-aware defects in the IC design.

18. A method for generating test patterns for testing a fabricated integrated circuit (IC) chip, the method comprising:
   generating, by an IC test engine executing on a computing platform, a plurality of single cycle test patterns that target a plurality of static single cycle defects of a fabricated IC chip based on an IC design; and
   fault simulating, by the IC test engine, the plurality of single cycle test patterns against a plurality of multicycle defects in the IC design, wherein a given single cycle test pattern of the plurality of single cycle test patterns is sim-shifted to enable detection of a given multicycle fault and/or defect of the plurality of multicycle faults and/or defects.

19. The method of claim 18, wherein the plurality of static single cycle defects are a plurality of single cycle boundary model defects, and the method further comprises fault simulating, by the IC test engine, the plurality of single cycle test patterns against a plurality of static single cycle cell-aware defects and a plurality of multicycle cell-aware defects of the fabricated IC chip, wherein the given single cycle test pattern of the plurality of single cycle test patterns enables detection of a given static single cycle cell-aware defect of the plurality of static single cycle cell-aware defects and a given static multicycle cell-aware defect of the plurality of static multicycle cell-aware defects.

20. The method of claim 18, wherein the plurality of static single cycle defects are a plurality of single cycle cell-aware defects, and the IC test engine marks-off the given multicycle fault and/or defect from further test pattern generation, the method further comprising:
   generating, by the IC test engine, a plurality of top-off single cycle test patterns that target untested multicycle cell-aware defects in the IC design.

* * * * *